Aug. 27, 1968 J. V. FREDD 3,398,762

VALVES

Filed Oct. 21, 1965 14 Sheets-Sheet 1

INVENTOR
John V. Fredd

BY Hastings Ackley
and
Walter J. Jagmin
ATTORNEYS

INVENTOR
John V. Fredd

BY Hastings Ackley and Walter J. Jagmin
ATTORNEYS

Aug. 27, 1968 J. V. FREDD 3,398,762

VALVES

Filed Oct. 21, 1965 14 Sheets-Sheet 3

INVENTOR
John V. Fredd

BY Hastings Ackley
and
Walter J. Jagmin
ATTORNEYS

Aug. 27, 1968 J. V. FREDD 3,398,762

VALVES

Filed Oct. 21, 1965 14 Sheets-Sheet 4

INVENTOR
John V. Fredd

BY E. Hastings Ackley and Walter J. Jagmin
ATTORNEYS

Aug. 27, 1968 J. V. FREDD 3,398,762

VALVES

Filed Oct. 21, 1965 14 Sheets-Sheet 5

INVENTOR
John V. Fredd

BY Hastings Ackley and Walter J. Jagmin

ATTORNEYS

Aug. 27, 1968 J. V. FREDD 3,398,762

VALVES

Filed Oct. 21, 1965 14 Sheets-Sheet 6

INVENTOR
John V. Fredd

BY Eastings Ackley and Walter J Jaeger ATTORNEYS

Aug. 27, 1968 J. V. FREDD 3,398,762

VALVES

Filed Oct. 21, 1965 14 Sheets-Sheet 7

INVENTOR

John V. Fredd

BY Hastings Ackley and Walter J. Jagmin

ATTORNEYS

INVENTOR
John V. Fredd

BY Hastings Ackley and Walter J. Jagmin
ATTORNEYS

Aug. 27, 1968 J. V. FREDD 3,398,762

VALVES

Filed Oct. 21, 1965 14 Sheets-Sheet 9

INVENTOR
John V. Fredd

BY Hastings Ashley and Walter J. Jay

ATTORNEYS

VALVES

Filed Oct. 21, 1965

INVENTOR
John V. Fredd
BY Evans, Hastings, Ackley and Walter J. Jagmin
ATTORNEYS Aug. 27, 1968 J. V. FREDD 3,398,762

VALVES

Filed Oct. 21, 1965 14 Sheets-Sheet 11

INVENTOR
John V. Fredd

BY Hastings Ackley and Walter J. Jagmin

ATTORNEYS

INVENTOR
John V. Fredd
BY Hastings Ashley and Walter J. Jagmin
ATTORNEYS

INVENTOR
John V. Fredd
BY E. Hastings Ackley and Walter J. Jagmin
ATTORNEYS

INVENTOR
John V. Fredd
BY E. Hastings Ackley and Walter J. Jagmin
ATTORNEYS

United States Patent Office 3,398,762
Patented Aug. 27, 1968

3,398,762
VALVES
John V. Fredd, Dallas, Tex., assignor to Otis Engineering Corporation, Dallas, Texas, a corporation of Delaware
Filed Oct. 21, 1965, Ser. No. 499,478
30 Claims. (Cl. 137—495)

ABSTRACT OF THE DISCLOSURE

Ball valves rotatable about more than one axis during movement between open and closed positions. Operator means cooperably engageable with the ball of said ball valves to rotate said ball about more than one radial axis thereof.

This invention relates to valves and more particularly to valves having a rotatable ball for opening and closing the valve.

An object of this invention is to provide a new and improved valve which is easily movable between its open and closed positions.

Another object is to provide a valve having a rotatable ball positioned between two tubular seat means and provided with an axial passage, the ball being rotatable between an open position wherein the axial passage of the ball is in alignment with the passages of the seat means and a closed position where it is out of alignment therewith and preventing fluid flow therethrough.

Still another object is to provide a valve of the type described which includes operator means operatively associated with the ball for rotating the ball about more than one radial axis thereof during its movement between open and closed positions in order to minimize the force required to rotate the ball.

Still another object is to provide the valve of the type described wherein the ball does not move longitudinally in the housing during its movement between its closed and open positions.

Still another object is to provide a valve of the type described wherein the ball is movable longitudinally as well as rotationally during its movement between its open and closed positions.

An important object is to provide a valve having a housing, seat members in the housing provided with longitudinally aligned passages and spaced facing seat surfaces, a ball rotatably disposed between the seat members and having an axial passage and operator means movable in the housing and engaged with the ball for rotating the ball between open and closed positions, wherein the operator means rotates the ball about more than one radial axis thereof during the movement of the ball between its open and closed positions.

Another object is to provide a valve of the type described wherein the operator means for rotating the ball includes means movable longitudinally within the housing and engageable with the ball at circumferentially spaced locations thereof for causing the ball to rotate about a first radial axis of the ball extending through at least one of such locations and about a second radial axis extending at an angle to the first axis.

Still another object is to provide a valve having longitudinally spaced tubular seat members movable longitudinally in a housing, a ball rotatably disposed between the seat members and having an axial passage, and operator means including operator members having pivot means extending into circumferentially spaced radial bores of the ball and pressure responsive means for moving the operator members in a predetermined manner in the housing to cause rotation of the ball about more than one radial axis thereof.

Still another object is to provide a valve wherein the pressure responsive means is responsive either to pressure conditions of the fluid whose flow is controlled by the valve or to an external fluid pressure.

Still another object is to provide a valve wherein the operator means includes means for imparting predetermined longitudinal and rotational movement to the operator member in the housing to cause the operator members to rotate the ball sequentially about a plurality of radial axes thereof.

A further object is to provide a valve of the type described wherein the ball is rotated only and not moved longitudinally in the valve housing during initial movement thereof from its closed and open positions and is moved longitudinally in the housing during subsequent movement thereof from its closed and open positions at substantially the time the axial passage of the ball is in position to permit flow through the valve to minimize the force required to rotate the ball.

Additional objects and advantages of the invention will be readily apparent from the reading of the following description of devices constructed in accordance with the invention, and reference to the accompanying drawings thereof, wherein.

Figure 1:
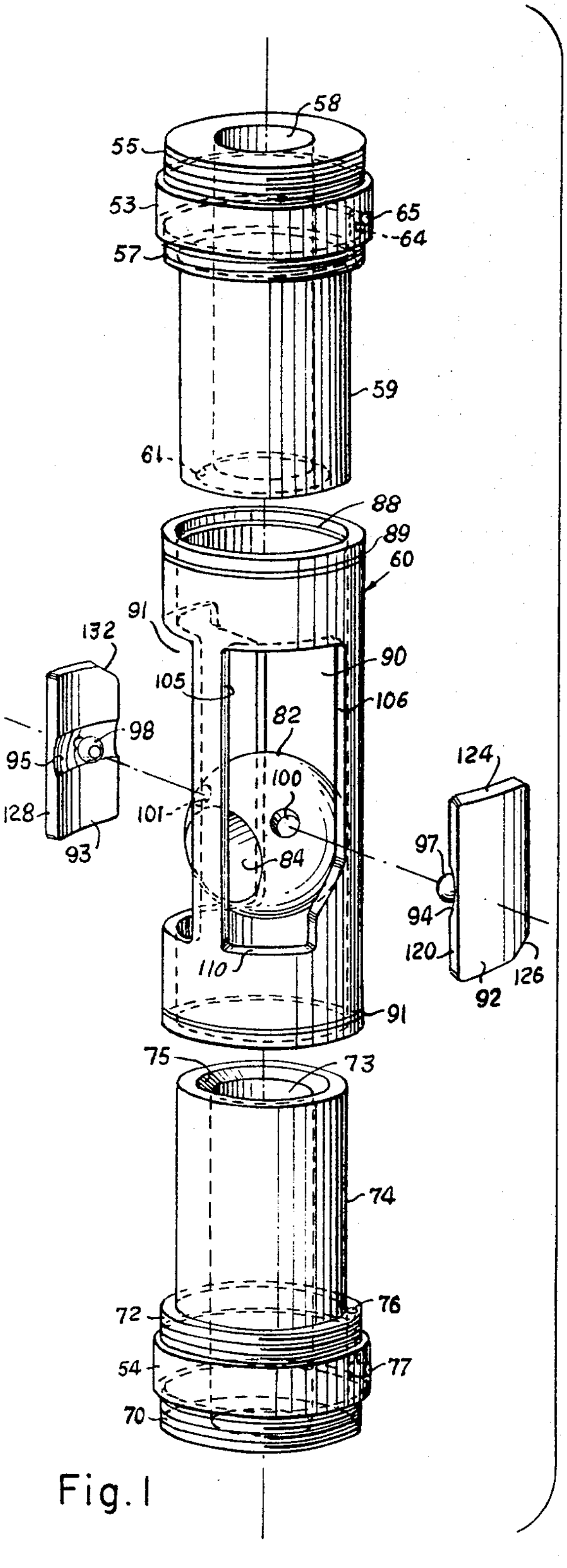
FIGURE 1 is an exploded perspective view of a valve having two operator members and a piston or operator sleeve for moving the operator members longitudinally and rotationally in its housing to cause rotation of the ball of the valve about more than one radial axis.

Referring now to FIGURES 1 through 12 of the drawings, the valve 50 embodying the invention includes a housing 51 having a middle tubular member 52 and tubular top and bottom end members 53 and 54. The top housing member has an externally threaded reduced top portion 55 by means of which the top member may be connected to a flow conductor 56 and a lower reduced external threaded portion 57 which is adapted to be threaded into the upper end portion of the middle housing member. The longitudinal passage 58 of the top housing member extends through its reduced tubular seat extension 59 which extends downwardly into the upper end of a piston or actuator sleeve 60 and is provided with an internal spherical seat surface 61 at its bottom end. The top housing member 53 has a passage 64 whose laterally outwardly opening threaded end portion 65 has a conduit 66 connected therein. The lower end of the passage opens to the upper annular space or chamber 68 above the upper end of the actuator sleeve and between the seat extension 58 and the middle housing member 52.

The bottom housing member 54 similarly has a reduced externally threaded portion 70 by means of which it may be connected to a flow conductor 71 and an upper reduced externally threaded portion 72 which is threaded into the lower end of the middle housing member 51. The longitudinal passage 73 of the bottom housing member extends through its tubular seat extension 74 which extends upwardly into the lower end of the actuator sleeve and is provided at its upper end with an internal annular spherical seat 75. The bottom housing member has a passage 76 whose laterally outwardly opening threaded end portion 77 has a flow conduit 78 connected therein. The upper end of the passage 76 opens to the lower annular space or chamber 80 below the lower end of the piston sleeve and between the middle housing member and the seat extension 74. It will be apparent that the two end housing members 53 and 54 are identical and interchangeable.

A ball 82 is rotatably disposed between the two seat surfaces 61 and 75 of the two seat extensions 59 and 74 and is held thereby against longitudinal and lateral displacement. The ball has an axial passage 84 which is in alignment and communication with the longitudinal passages 58 and 73 of the two end housing members 53 and 54, respectively, when the ball is in its open position illustrated in FIGURES 2 and 3 and which is out of alignment and communication with the passages of the end housing members, thus preventing fluid flow through the valve between the flow conductors 56 and 71, when the ball is in its closed position illustrated in FIGURES 7 and 10.

It will be apparent that when the ball is in its closed position and the pressure in the flow conductor 56 is greater than the pressure within the flow conductor 71, a downwardly acting pressure differential holds the outer spherical surface of the ball in sealing engagement with the seat 75. If the pressure within the flow conductor 71 is greater than within the flow conductor 56 and the ball is in its closed position the outer surface of the ball is held in seating and sealing engagement with the seat 61.

The actuator sleeve is provided adjacent its upper end with an internal annular recess in which is disposed an O-ring 88 which seals between the actuator sleeve and the seat extension 59 and with an external annular recess in which is disposed an O-ring 89 which seals between the actuator sleeve and the middle housing member. The piston sleeve is similarly provided adjacent its lower end with an internal annular recess in which is disposed an O-ring 90 which seals between the seat extension 74 and the actuator sleeve and with an external annular recess in which is disposed an O-ring 91 which seals between the piston sleeve and the middle housing member.

It will be apparent that the actuator sleeve may be moved between its upper and lower positions in the housing by selectively introducing fluid under pressure into one of the annular chambers 58 and 80 and permitting escape of fluid from the other chamber.

The actuator sleeve has a pair of longitudinal windows 90 and 91 in which are disposed actuator members 92 and 93, respectively, which may be in the form of segments of a cylinder. The actuator members have internal spherical surfaces 94 and 95, of radius slightly greater than the radius of the external surface of the ball 82, and actuator pins 97 and 98, respectively, which extend radially inwardly from the spherical surfaces thereof into the radial bores 100 and 101, respectively, of the ball. The pins preferably have spherical surfaces at the locations of their contact with the surfaces of the ball defining the bores. The central axes of the bores are spaced substantially 110 degrees about the longitudinal central axis L—L of the ball, which also the central axis of the axial passage 84 thereof and are spaced from both the axis L—L and the central axis X—X of the ball which extends perpendicularly relative to the axis L—L. The axes X—X and L—L intersect at the center of the ball. The central axes of the bores extend at angles of approximately 30 degrees relative to the plane in which lies the axis X—X of the ball.

One side of the window 90 of the actuator sleeve is defined by a vertical side surface 105 of the sleeve while its other side is defined by an upper vertical surface 106, an inclined intermediate cam surface 107 and a lower short vertical surface 108. The top of the window is defined by a top surface 109 of the sleeve while its bottom is defined by an upwardly facing surface 110 which extends between the lower ends of the vertical surfaces 105 and 108. One side of the window 91 is similarly defined by a vertical surface 112 and its other side is defined by a lower vertical surface 113, an intermedate upwardly sloping surface 114 and an upper short vertical surface 115. The upper end of the window 91 is defined by the downwardly facing surface 116 which extends between the upper ends of the vertical surfaces 112 and 115 and its bottom is defined by the upwardly facing surface 117 which extends between the lower ends of the vertical surfaces 112 and 113 of the actuator sleeve. It will be apparent that the two windows 90 and 91 are of similar configuration but reversed vertically.

Circumferential movement of the actuator member 92 in one direction within the window 90 relative to the sleeve is limited by the engagement of its vertical side surface 120 with the vertical side surface 105 of the sleeve and in the opposite direction by the engagement of its other side surface 121 with the side surfaces 106 and 108. Its vertical movement in the window 90 relative to the sleeve is limited by the engagement of its top and bottom surfaces 124 and 125 with the top and bottom surfaces 109 and 110, respectively. The actuator member has an inclined cam surface 126 which extends between its vertical side and bottom surfaces 121 and 125 and which is engageable with the cam surface 107 of the sleeve so that upon upward movement of the sleeve from its lowermost position in the housing 1, FIGURE 2, the camming engagement of the surfaces 107 and 126 tends to move the actuator member 92 upwardly and to the left as seen in FIGURE 2.

The actuator member 93 is of the same configuration as the actuator member 92 and its circumferential movement in one direction within the window 91 relative to the sleeve is limited by the engagement of its vertical side surface 128 with the side surface 112 of the sleeve and in the opposite direction by the engagement of its other side surface 129 with the vertical surfaces 113 and 115 of the sleeve. Its vertical movement within the window and relative to the sleeve is limited by the engagement of its top and bottom surfaces 130 and 131 with the surfaces 116 and 117, respectively, of the sleeve. The actuator member 93 has an inclined cam surface 132 which extends between its side and top surfaces 129 and 130, respectively, and which is engageable with the inclined cam surface 114 of the sleeve so that upon downward movement of the actuator sleeve from its uppermost position in the housing, FIGURE 10, the camming engagement of the cam surfaces 132 and 114 tends to move the actuator member downwardly and to the right as seen in FIGURE 10.

Figure 2:
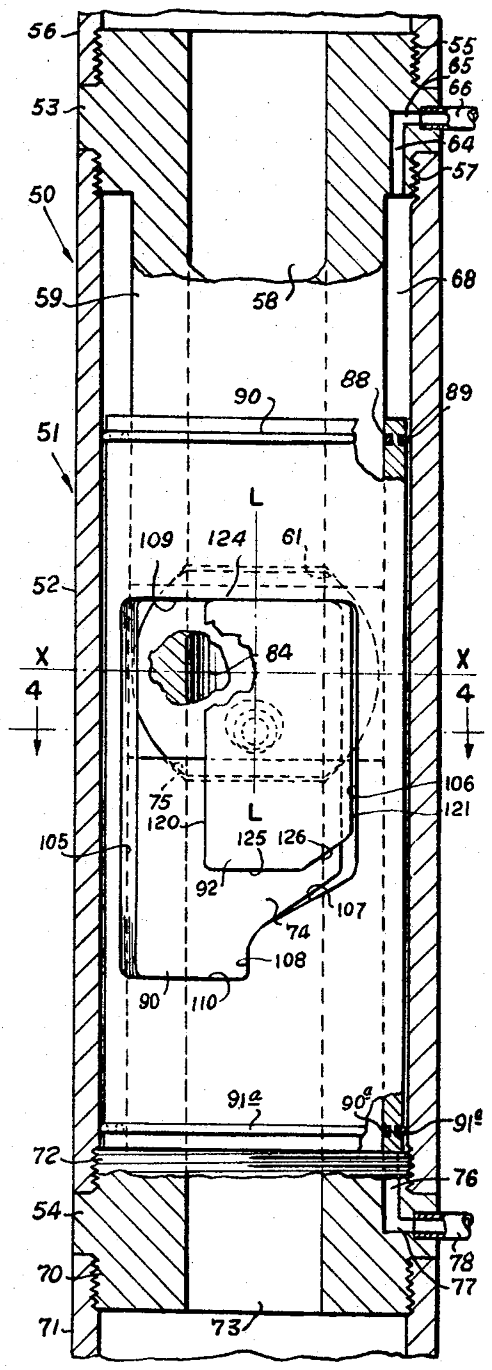
FIGURE 2 is a vertical partly sectional view, with some parts broken away, of the valve illustrated in FIGURE 1 showing the positions of the operator sleeve and one of the operator members when the valve is open.
Figure 3:
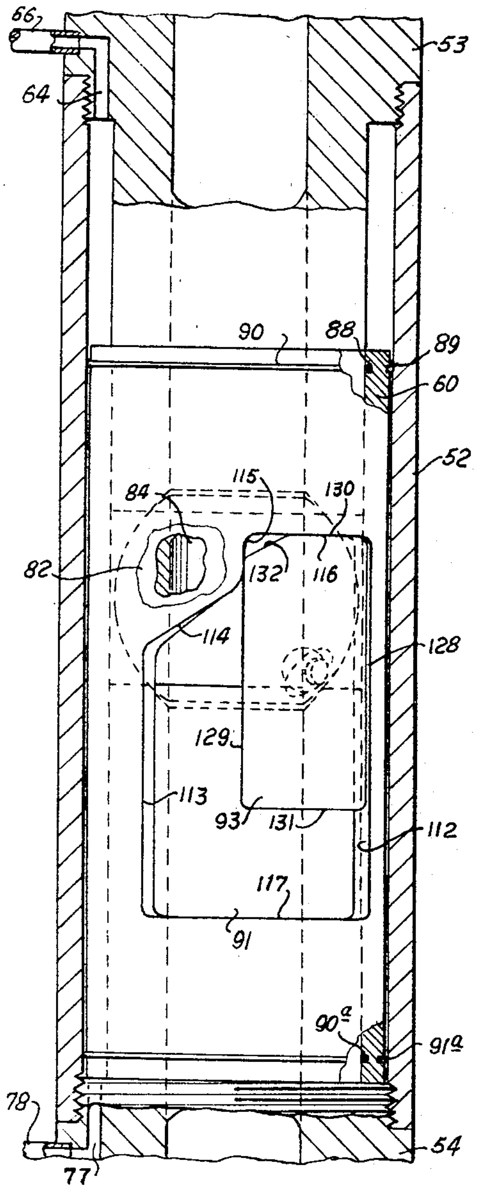
FIGURE 3 is a view similar to FIGURE 2 showing the position of the other of the operator members when the valve is open.
Figure 4:
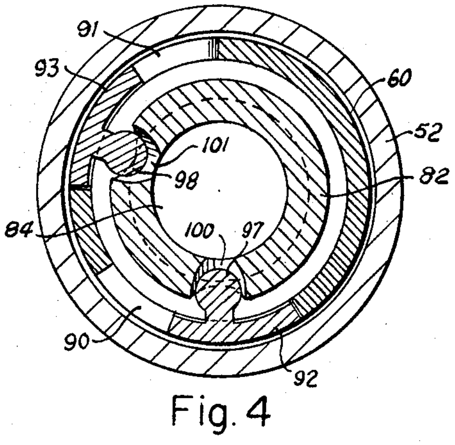
FIGURE 4 is a sectional view taken on line 4—4 of FIGURE 2.
Figure 8:
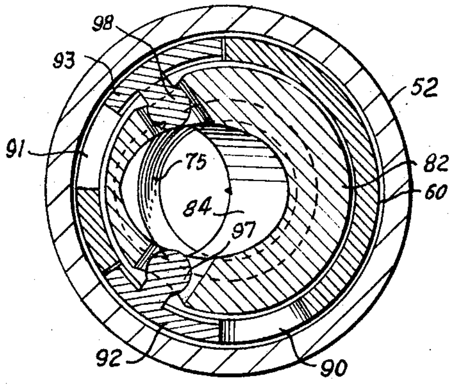
FIGURE 8 is a sectional view taken on line 8—8 of FIGURE 6.
Figure 9:
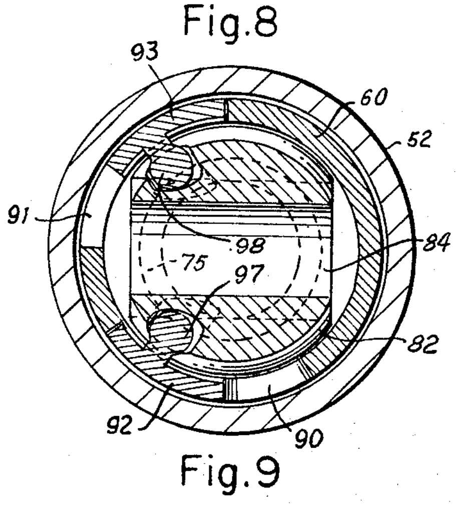
FIGURE 9 is a sectional view taken on line 9—9 of FIGURE 7.
Figure 5:
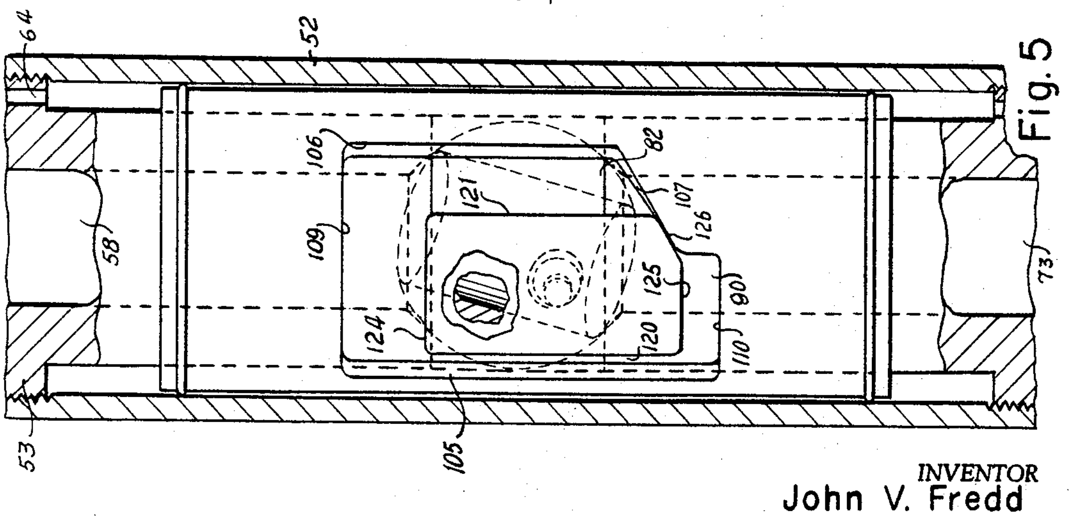
Figure 12:
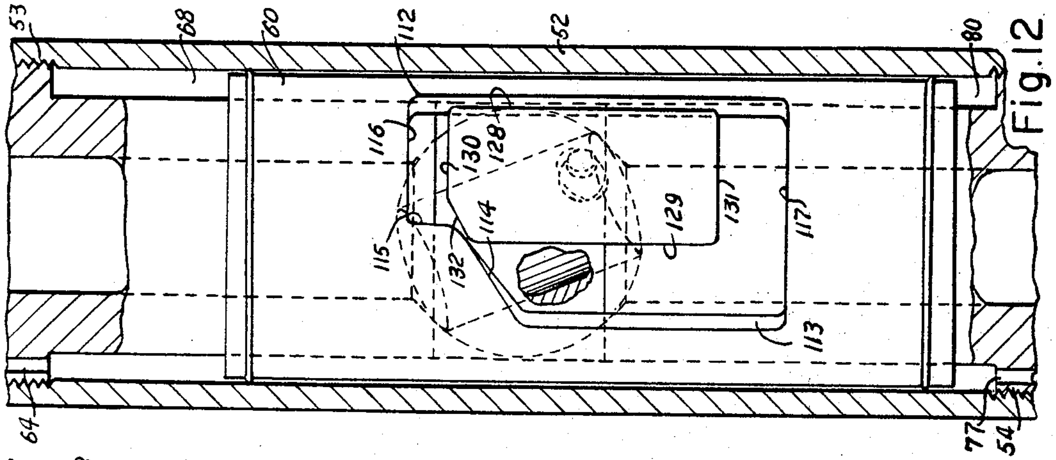
FIGURES 10, 11 and 12 are vertical partly sectional views, with some parts broken away, showing the positions of the operator sleeve and the other of the operator members at different stages of the movement of the valve from its closed to its open position.
Figure 11:
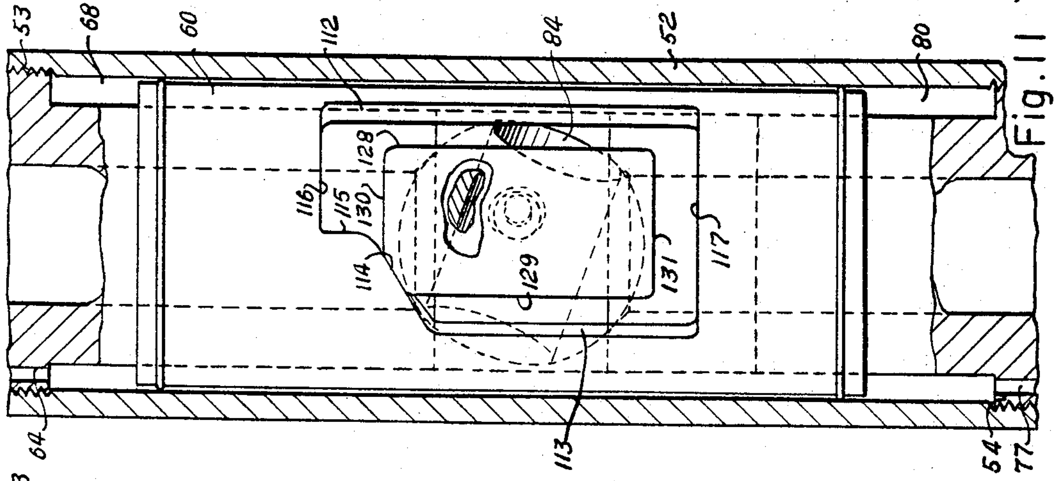

Assuming now that the components of the valve are in the positions illustrated in FIGURES 2 and 3 of the drawings with the ball in its open position wherein its axial passage 84 is in alignment with the passages 58 and 73 of the two housing end members 53 and 54 so that fluid may flow between the flow conductors 56 and 71, and that the actuator sleeve is held against rotation within the housing, the actuator sleeve will move upwardly in the housing when fluid under pressure is introduced into the lower chamber 80 through the conductor 78 and the passage 76. As the actuator sleeve moves upwardly to the position wherein its cam surface 107 at the window 90 moves into engagement with the cam surface 126 of the actuator member 92, the cam surface 114 at the window 91 moves upwardly to a position wherein it will permit the actuator member 93 to move to the left as seen in FIGURE 4, as its cam surface 132 may slide past the cam surface 114 during further upward movement of the actuator sleeve. Further upward movement of the actuator sleeve then causes the cam surface 107 thereof to engage the cam shoulder 126 of the actuator member 92 whereupon the camming engagement of the cam surfaces 107 and 126 imparts a force to the actuator member 92 which moves it upwardly and to the left as seen in FIGURE 5. The operator member 93 remains stationary since the actuator sleeve does not now engage its bottom shoulder 131 and the ball is thus rotated about an axis Y—Y as seen in FIGURE 4 which is also the longitudinal central axis of the bore 101 of the ball and extends upwardly at an angle of approximately 30 degrees relative to the central axis X—X of the ball which extends perpendicularly to the central longitudinal axis of its axial bore 84. Continued upward movement of the actuator sleeve, due to the engagement of the cam shoulders 107 and 126, then causes continued rotational movement of the ball about the axis Y—Y through an angle of approximately 67 degrees until the cam shoulder 107 moves out of engagement with the cam shoulder 126, FIGURE 6. At this time, the bottom shoulder 117 of the sleeve defining the bottom end of the window 91 engages the bottom surface 131 of the operator member 93. Further circumferential movement of the operator member 92 in either direction is now prevented by the engagement of the side surfaces 120 and 121 of the operator member 92 with the side surfaces 105 and 108 of the actuator sleeve. Further upward movement of the actuator sleeve now causes upward movement of the actuator member 93 and also the clockwise circumferential movement. Such movement of the operator member 93 now rotates the ball approximately 67 degrees about an axis Z—Z, which is also the longitudinal central axis of the bore 101 and extends upwardly at an angle of 30 degrees relative to the central axis X—X of the ball and through the center of the ball. The ball is thus rotated about the axis Z—Z from the position illustrated in FIGURE 6 to the position illustrated in FIGURES 7, 9 and 10 wherein the ball is in its closed position with its axial passage out of alignment with the passgaes 58 and 73 of the housing end members thus preventing fluid flow between the conductors 56 and 71.

Figure 7:
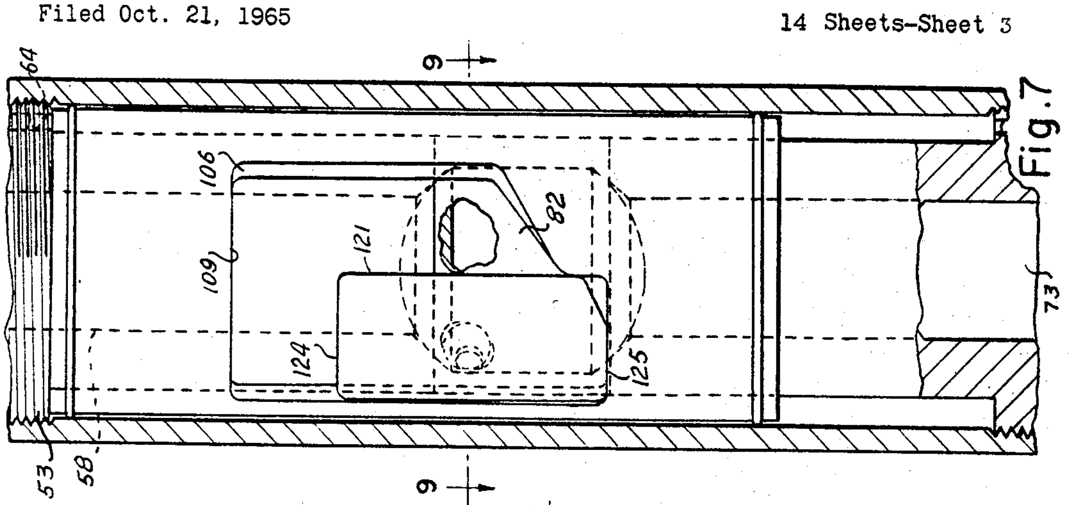
FIGURES 5, 6 and 7 are views similar to FIGURE 2 showing the positions of the operator sleeve and of one of the operator members at different stages of the movement of the valve from its open to its closed position.
Figure 6:
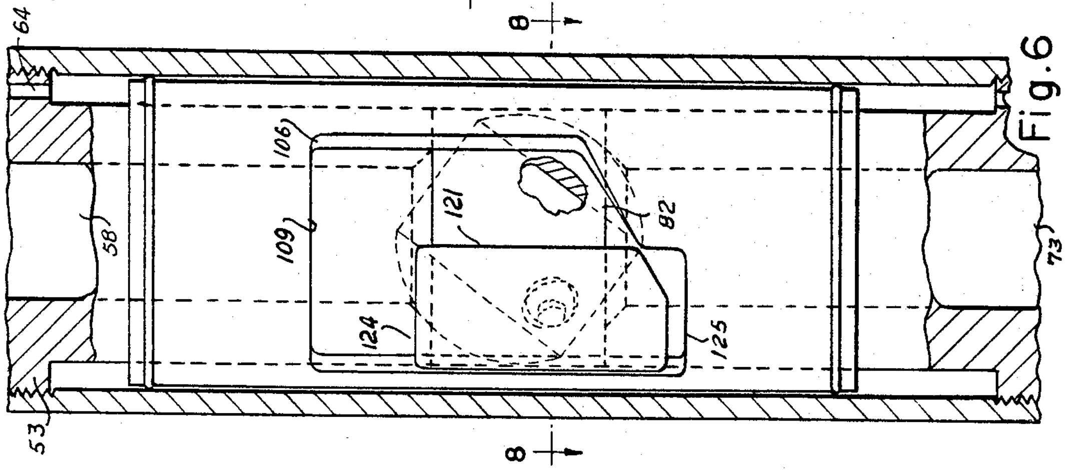
Figure 10:
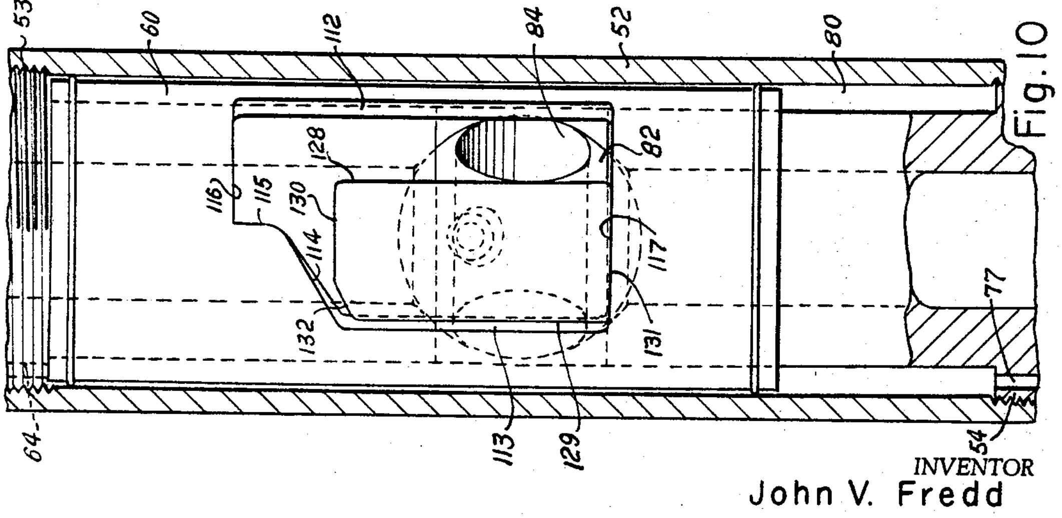
Figure 13:
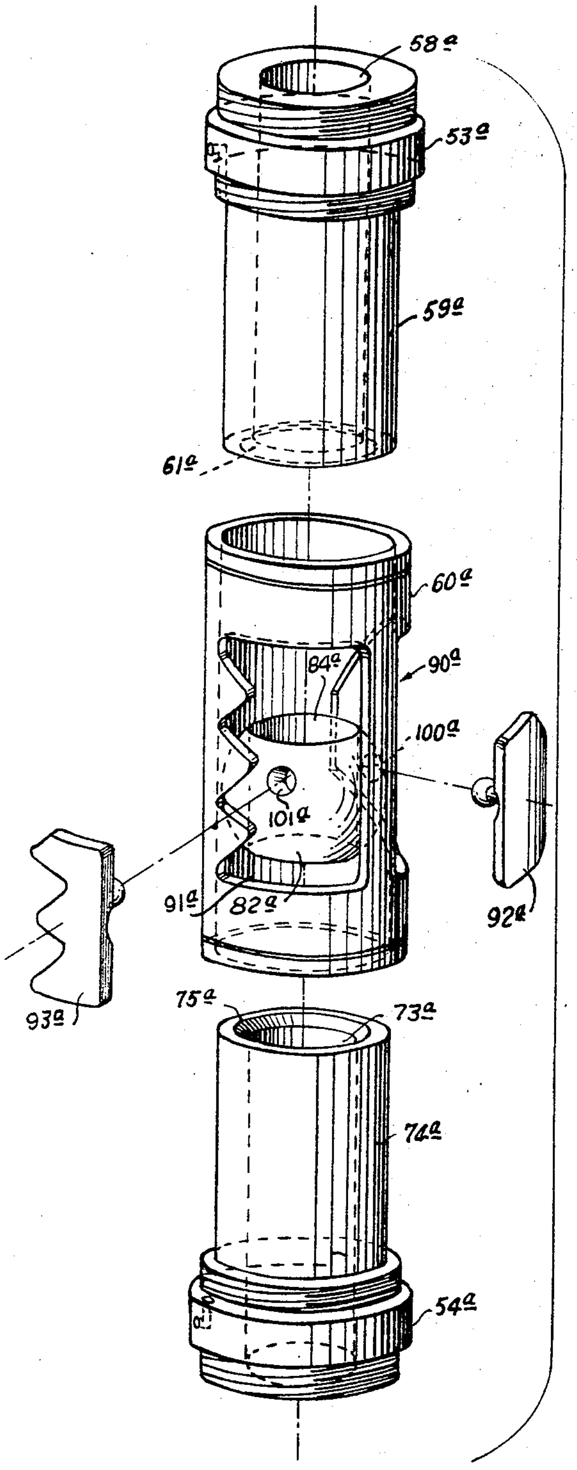
FIGURE 13 is an exploded perspective view of another valve embodying the invention whose operator members and sleeve have different configurations than those of the valve illustrated in FIGURES 1 through 12.

It will now be apparent that the rotation of the ball through angles of approximately 67 degrees about each of two different axes each inclined at an angle of approximately 30 degrees to the central axis X—X of the ball causes the central axis of the axial passage of the ball to be displaced 90 degrees from its original position illustrated in FIGURES 2 and 3 to the position illustrated in FIGURES 7 and 10 at the conclusion of the upward movement of the actuator sleeve.

It will be noted that in the above discussion it was assumed that, as the actuator sleeve moved upwardly, first the operator member 92 moved circumferentially and upwardly while the operator member 93 remains stationary and then the operator member 93 moved upwardly and circumferentially, and that the actuator sleeve itself did not rotate about its central longitudinal axis, so that the ball was caused to rotate first about one axis Y—Y and then about the other axis Z—Z. In actual operation, the operator members 92 and 93 may simultaneously move circumferentially during certain portions of the upward movement of the actuator sleeve and the actuator sleeve itself may also rotate during its upward movement, so that the ball may rotate about an axis which is itself moving between the two axis Y—Y and Z—Z during certain portions of the rotation of the ball. The timing of the various circumferential and vertical movements of the two operator members and the actuator sleeve relative to each other and to the ball during the upward movement of the actuator sleeve is determined by the frictional forces resisting movements of the operator members, the actuator sleeve and the ball valve relative to each other. Relative movements of the operator members, the actuator sleeve and the ball will thus take place in such sequence and at such times during the upward movement of the actuator sleeve as requires the smallest force to cause relative movement between any two of these elements at any one moment of upward movement of the actuator sleeve.

When it is desired to re-open the valve, fluid under pressure is admitted to the upper chamber 68 through the passage 64 and the conduit 66 while fluid is allowed to escape from the lower chamber 80 through the passage 76 and the conduit 78. As the actuator sleeve is thus caused to move downwardly from its uppermost position illustrated in FIGURES 7, 9 and 10, and assuming again that the actuator sleeve is held against rotation about its longitudinal axis, and that the circumferential movements of the two operator members do not take place simultaneously, during any portion of the downward movement of the actuator sleeve, the camming engagement of the actuator sleeve surface 114 with the shoulder 132 of the operator member 93 first causes the operator member 93 to move downwardly and to the right, FIGURE 11, while the operator member 92 is stationary, and causes rotation of the ball 67 degrees about the axis Z—Z, in the opposite direction from the position illustrated in FIGURE 10 from that in which the ball was rotated about the axis Z—Z during upward movement of the actuator sleeve. When the circumferential movement of the operator member 93 is arrested upon the engagement of its side surfaces or shoulders 120 and 121 with the surfaces 115 and 112 of the actuator sleeve, continued downward and circumferential movement of the operator member 92 then causes the rotation of the ball approximately 67 degrees about the axis Y—Y, in the opposite direction from that in which the ball was rotated during upward movement of the actuator sleeve, back to its original open position illustrated in FIGURES 2 and 3.

It will now be apparent that the axis of rotation of the ball during the downward movement of the actuator sleeve may also be moving between the axis Y—Y and Z—Z depending upon the frictional forces between the operator members, the ball and the actuator sleeve.

It will be apparent that the central axes of the bores 100 and 101 extend at angles of 110 degrees from each other in the central plane of the ball in which they lie and that their angle of separation measured in the plane in which the central horizontal axis X—X of the ball lies in exactly 90 degrees and that, therefore, each operator member during the full stroke or longitudinal movement of the actuator sleeve travels through an angle of approximately 60 degrees relative to the ball about vertical central axis of the ball.

It will now be apparent that a new and improved valve has been illustrated and described which includes a ball having an axial passage, an operator means for rotating a ball about axes which lie in a plane which extends angularly at an angle of approximately 30 degrees to central plane of the ball which is perpendicular to the longitudinal central axis of the axial passage of the ball.

It will further be seen that the valve includes an actuator member or means such as the sleeve 60 and a pair of operator means such as the operator members 92 and 93 which are movable circumferentially and vertically by the sleeve during the vertical movement of the sleeve relative to the ball and that the operator member and the ball have co-engageable means such, as the pins of the operator members and the surfaces defining the bores 100 and 101 of the ball, which cause the ball to rotate about more than one axis during its movement between its open and its closed positions.

It will further be seen that the provision of an operating means, such as the operator members and actuator sleeve, which rotates the ball about more than one axis or about a moving axis, permits the valve to be moved between its open and closed positions by a relatively small force for any given pressure differential to which the ball is subjected which exerts a force tending to hold the ball valve in frictional engagement with one or the other of the spherical seat surfaces 61 or 75, both because of the mechanical advantage of the operating device which requires a relatively long stroke or movement of the actuator sleeve due to the circumferential and vertical movement of the operator members and because the locations of contact of the pivot pins with the surfaces defining the bores of the ball are at all times spaced radially a substantial distance from the center of the ball.

Refering now particularly to FIGURES 13 through 23 of the drawings, the valve **50*a* is similar to the valve 50, differing therefrom in the configuration of its windows 90*a* and 91*a* and its actuator or operator members 92*a* and 93*a***, and secondary its various elements have been provided with the same reference numerals, to which the subscript *a* has been added, as the corresponding elements of the valve 50. The window **90*a* defined by the side surface or shoulder 201, top and bottom shoulders 202 and 203, a middle vertical side surface 204 which faces the shoulder 201, and upper and lower arcuate cam or guide surfaces 205 and 206. The upper cam surface 205 extends arcuately upwardly from the upper end of the vertical side surface 204 to the top surface 202 and the lower cam surface extends arcuately downwardly to one end of the bottom surface 203**.

Figure 22:
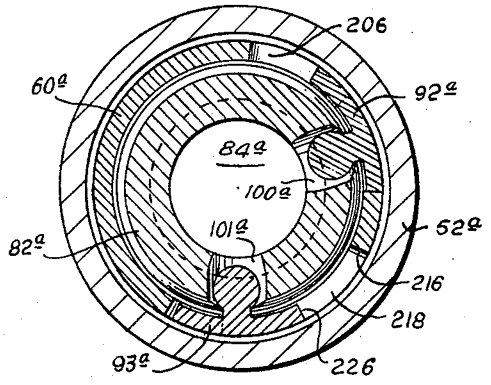
FIGURE 22 is a sectional view taken on line 22—22 of FIGURE 14.

The operator member **92*a*, which is located within the window or aperture 90*a* of the actuator sleeve, has one vertical side shoulder or surface 208 which is engageable with the side surface 201 of the sleeve to limit its circumferential movement relative to the actuator sleeve in a clockwise direction, FIGURE 22, top and bottom surfaces or shoulders 209 and 210 which are engageable with the top and bottom shoulders 202 and 203 of the sleeve to limit its longitudinal movement relative to the actuator sleeve, arcuate upper and lower cam surfaces 212 and 213 which are engageable with the cam surfaces 205 and 206 of the actuator sleeve, and a vertical side surface 214 which extends between the upper and lower ends of the upper and lower cam shoulders 212 and 213. The window 91*a* has one side thereof defined by a vertical side surface or shoulder 216, and top and bottom surfaces or shoulders 217 and 218. The sleeve has a plurality of teeth or cam projections 221 extending from its vertical side surface 221 toward the vertical side surface 216, each defined by upper and lower surfaces 223 and 224, respectively, which converge toward the arcuate end surfaces 225** of the teeth.

The operator member **93*a* which is disposed in the window 91*a* has a vertical side or shoulder surface 226 which is engageable with the side surface 216 of the actuator sleeve to limit its circumferential movement in the window in a counterclockwise direction, FIGURE 22, and top and bottom surfaces 227 and 228 which are engageable with the top and bottom shoulders 217 and 218 of the actuator sleeve. The side of the operator member 93a opposite its vertical side has a plurality of teeth 230 which are adapted to mesh with the teeth 221 of the actuator sleeve. The top and bottom teeth 230a and 230c are defined by the top and bottom shoulders 227 and 228 of the operator member and the shoulders 233 and 234 which converge outwardly of the outer arcuate end surfaces or shoulders 235a and 235c of the top and bottom teeth. The middle tooth 230b is defined by the upper and lower shoulders 234b and 233b, respectively, which converge outwardly toward its arcuate end surface or shoulder 235b**.

The pivot pins 97a and 98a of the operator members are received in the bores 100a and 101a of the ball 82a which is identical to the ball 82 of the valve 50.

Figure 14:
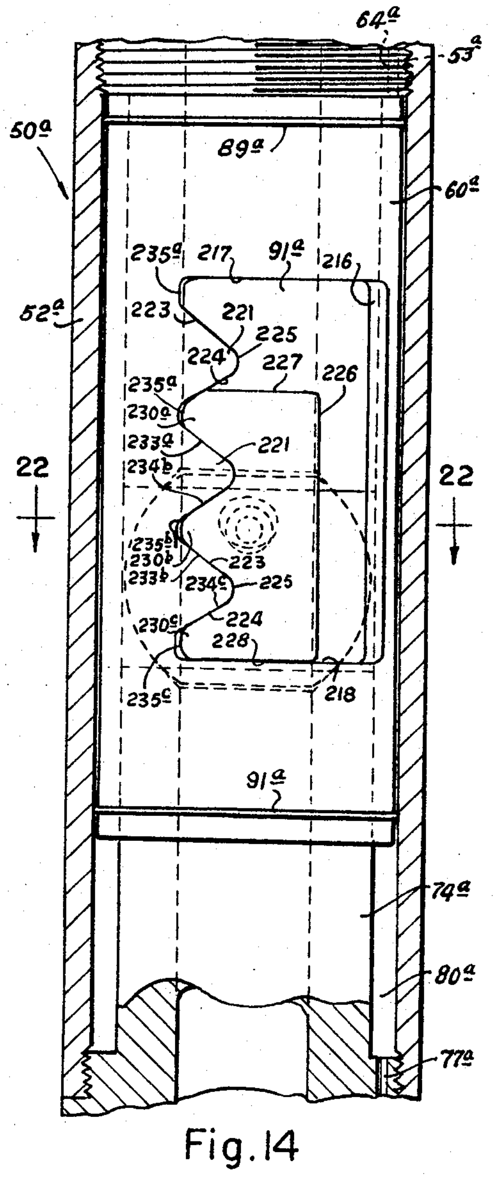
FIGURE 14 is a vertical partly sectional view showing the positions of the operator sleeve and one of the operator members of the valve illustrated in FIGURE 13 when the valve is in its closed position.
Figure 17:
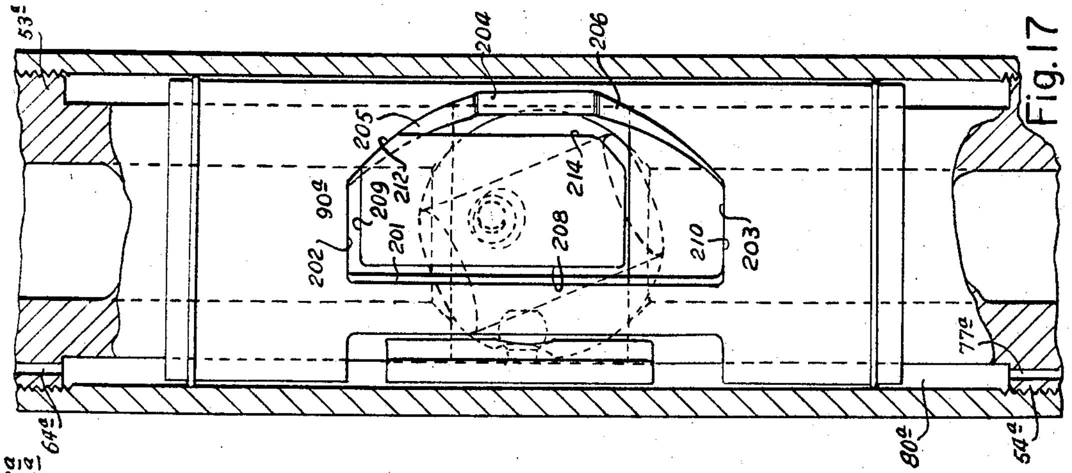
FIGURES 16 and 17 are vertical sectional views showing intermediate positions of the two operator members when the ball has been moved from its open toward its closed position.
Figure 16:
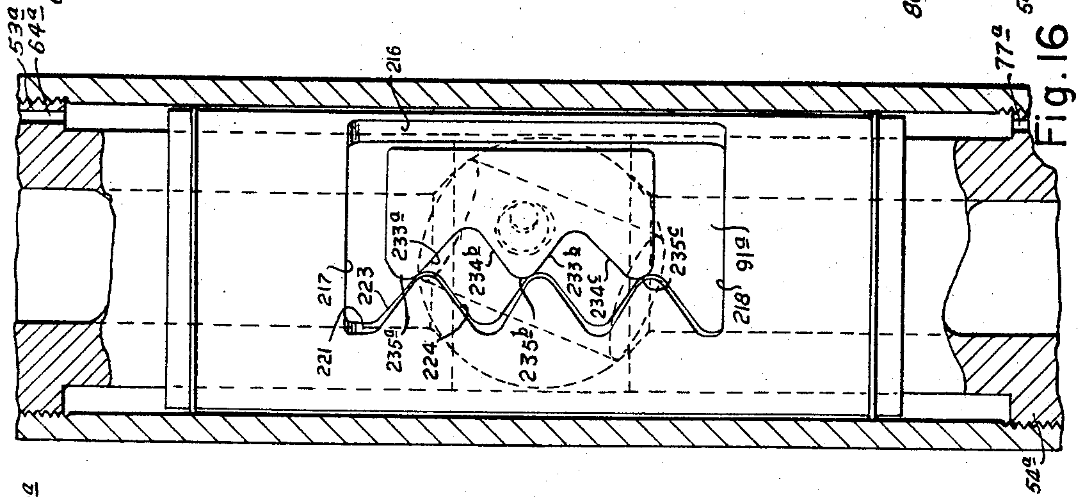
Figure 15:
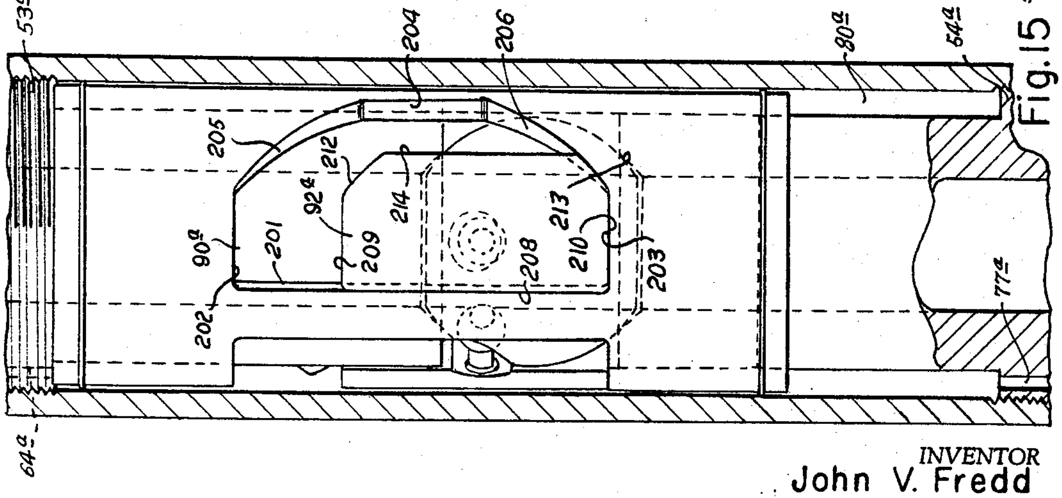
FIGURE 15 is a vertical sectional view similar to FIGURE 14 showing the position of the other operator member when the valve is in open position.

Assuming that the actuator sleeve is held against rotation in the housing and that fluid under pressure is introduced into the upper chamber 68a of the valve 50a through the conduit 66a and the passage 64a and fluid is allowed to escape from the lower chamber 80a through the passage 76a and conduit 78a, the force of the fluid under pressure moves the actuator sleeve downwardly in the housing from its uppermost position illustrated in FIGURES 14 and 15 in the valve housing 51a. As the actuator sleeve moves downwardly, the camming engagement between the downwardly facing shoulders 224 of the actuator teeth 221 with the upwardly facing surfaces 234 of the teeth 230 moves the operator member 93a downwardly and to the right as seen in FIGURE 16. The operator member 93a thus moves circumferentially in a counterclockwise direction, FIGURE 22, relative to the actuator sleeve until the extreme end surfaces of the teeth of the actuator sleeve and of the operator member 93a are moved into alignment. During this downward and circumferential movement of the operator member 93a, the actuator member 92a is moved circumferentially in a counterclockwise direction until its upper cam shoulder 212 engages the cam shoulder 205 of the actuator sleeve. During this movement of the two operator members the ball is caused to rotate about an axis which lies in the same plane as the central longitudinal axes Y—Y and Z—Z of the bores 100a and 101a, this plane extending at an angle of approximately 30 degrees relative to the plane in which lies the central axis X—X which extends perpendicularly to the longitudinal central axis of the longitudinal passage 84a of the ball 82a. The axis of rotation of the ball may shift if the operator member moves circumferentially from the axis Y—Y toward the axis Z—Z. Further downward movement of the actuator sleeve due to the camming engagement of the shoulders 205 and 212 causes the actuator member 92a to move downwardly and to the right and therefore circumferentially in a clockwise direction, FIGURE 22, relative to the sleeve and also causes movement of the operator member 93a in a similar direction thus causing rotation of the ball about an axis which shifts toward the axis Z—Z and then is coincident therewith until the sleeve valve and the operator members are in the positions illustrated in FIGURES 18 and 19 of the drawing wherein the operator members are now in the uppermost positions in the windows of the sleeve and the ball is in its closed position.

Figures 18, 19, 20:
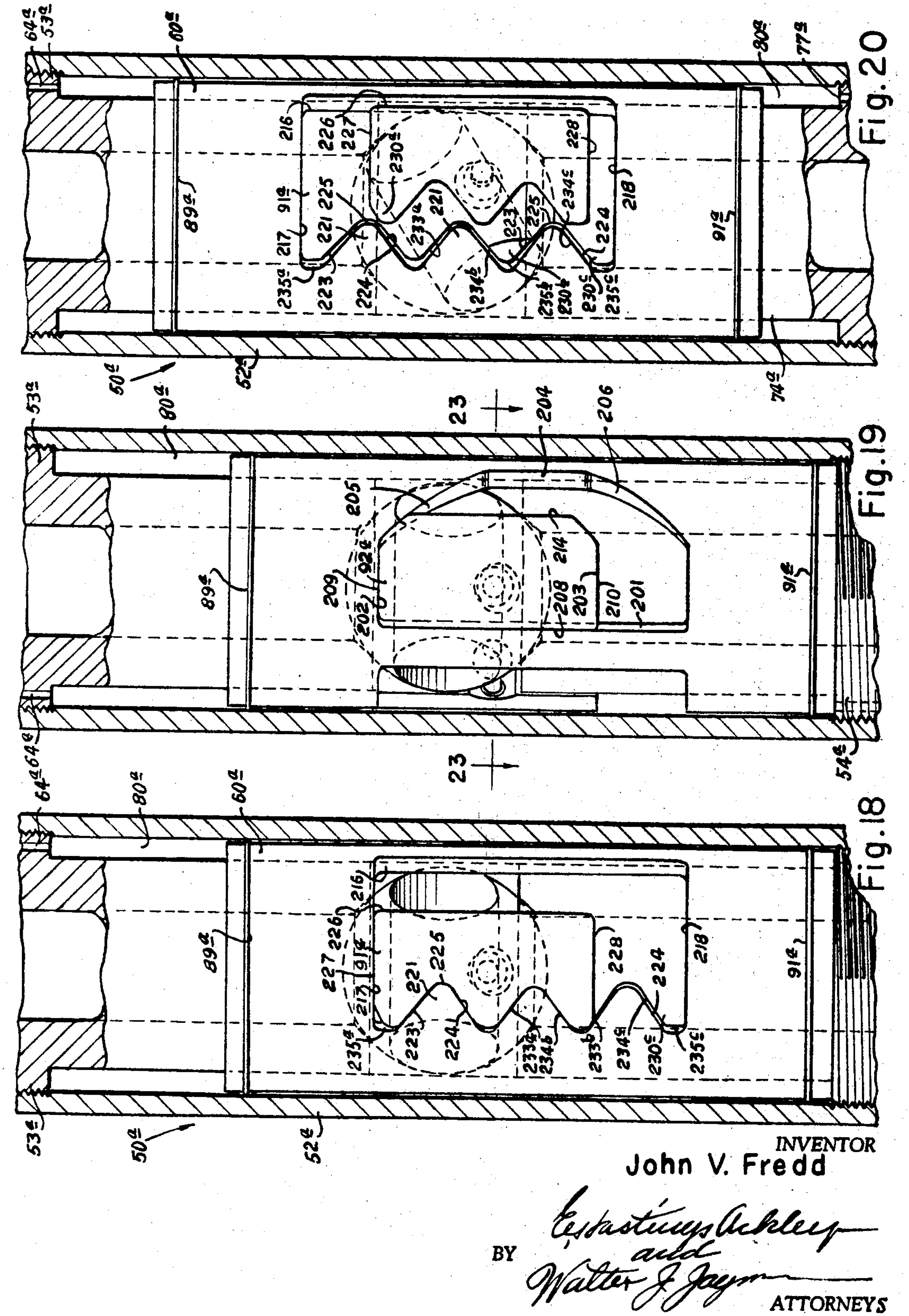
FIGURES 18 and 19 are vertical partly sectional views showing the positions of the operator members when the valve is in its closed position.
FIGURES 20 and 21 are vertical sectional views showing intermediate positions of the operator members when the ball has been moved from its closed toward its open position.
Figure 21:
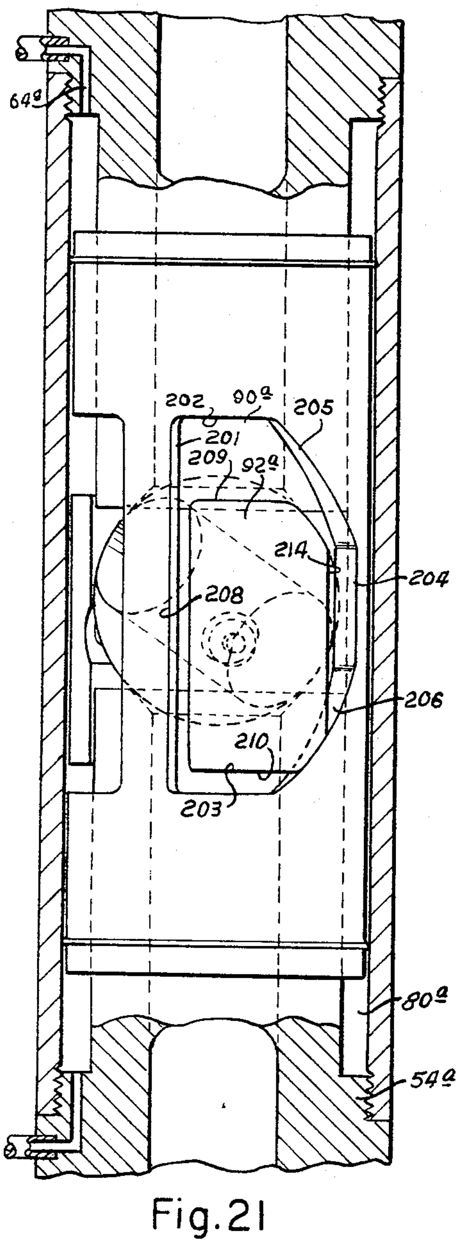
Figure 23:
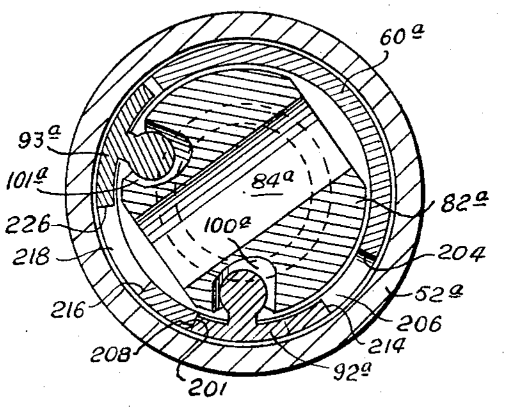
FIGURE 23 is a sectional view taken on line 23—23 of FIGURE 19.

When it is desired to re-open the valve, fluid under pressure is introduced into the lower chamber 80 through the duct 78a and the passage 76a and permitted to escape from the upper chamber 68a through the passage 64a and the duct 66a whereupon the actuator sleeve is moved upwardly in the housing. During upward movement of the actuator sleeve the camming engagement of the shoulders 223a of the teeth 221a of the upwardly facing shoulders 223a of the actuator sleeve teeth 221 now tend to move the actuator member 93a upwardly and to the right as seen in FIGURE 18 and therefore circumferentially clockwise as seen in FIGURE 23, such movement imparted to the operator member 93a also tends to move the operator member 92a upwardly and to the right until the lower cam shoulder 213 thereof engages the cam shoulder 206 of the operator member 92a. At this time the teeth of the operator member 93a have moved out of meshing engagement with the teeth 221 of the sleeve. The camming engagement of the shoulders 213 and 206, as upward movement of the actuator sleeve continues, then moves the actuator member 92a upwardly and to the left as seen in FIGURE 21 and the actuator member 93a upwardly and to the left as seen in FIGURE 20 until the operator members are again in their positions shown in FIGURES 14 and 15.

It will now be seen that the valve 50a is similar in mode of operation to the valve 50 and its means for rotating the ball between its closed and open positions, the actuator sleeve 60a and the operator members 92a and 93a, cause the ball to rotate about two or more axes or a constantly moving axis.

Referring now particularly to FIGURES 24 through 32 of the drawings, the valve 300 embodying the invention is connectable to the lower end of a suitable lock mandrel assembly 301 by means of which the valve may be locked in the well tubing to prevent upward flow of fluids therethrough when the pressure differential across the valve exceeds a predetermined value, as, for example, if the pressure in the string of tubing above the valve decreases due to damage of malfunction of the equipment of the well which permits uncontrolled or unduly great flow of fluids from the tubing. The valve 300 includes a tubular housing 302 having a top section 303, into whose upper end portion is threaded the lower portion 304 of the lock mandrel 301, and a lower bottom section 307 whose upper end portion is telescoped over the intermediate reduced portion 308 of the top section. Upward movement of the bottom section on the top section is limited by the engagement of the annular top end shoulder 309 of the bottom section with the downwardly facing annular shoulder 310 of the top section. The housing sections are releasably secured to one another by a retainer wire 311 whose outer portions are received in an internal annular recess 312 of the bottom housing section and whose inner portions are received in the external annular recess 314 of the top housing section. The retainer wire is insertable into the aligned recesses 312 and 314 through a slot 315 of the bottom housing section.

An O-ring 317 disposed in an external annular recess of the top housing section seals between the top and bottom housing sections below the retainer wire and above an annular piston chamber 318 provided by the bottom housing section and the externally reduced dependent extension 319 of the top housing section. The reduced lower end portion 321 of the dependent extension telescopes into an annular upper seat member 322. Upward movement of the upper seat member on the dependent housing extension is limited by the engagement of its top upwardly facing end shoulder with the downwardly facing annular external shoulder 324 of the housing extension. The upper seat member has an internal annular flange 326 which provides an upwardly facing annular shoulder 327 which engages the downwardly facing annular shoulder 328 of an annular ring or bean 330 disposed within the upper seat member and held against upward movement by the engagement of its top annular surface with the annular bottom end surface 334 of the housing extension. The bean has an external annular recess in which is disposed an O-ring 335 which seats between the bean and the seat member. The passage 338 of the bean is of smaller diameter than the longitudinal passages 339 and 340 of the top housing section and the seat member. A tubular piston 342 extends upwardly into the chamber 318 and has an internal annular flange 344 at its upper end portion provided with an internal annular recess in which is disposed an O-ring 345 and a back-up ring 346 therefore. The O-ring seals between the piston flange and the external surface of the intermediate top housing section extension 319. Fluid pressure from the passage 339 of the top housing section above the bean 330 is communicated to the exterior of the top housing section below the piston flange 344 and above an O-ring 347 disposed in a suitable external annular recess of the upper seat member which sealingly engages the seal surface 348 the piston and the upper seat member through the lateral ports 349 of the top housing section. A back-up ring 350 for the O-ring 347 is also disposed in the external recess of the upper seat member.

A ball 352 provided with an axial passage 353 is disposed between the upper seat member 322 and a lower tubular seat member 354, its outer spherical face engaging the spherical seat surfaces 355 and 356 of the upper and lower seat members, respectively. Downward movement of the lower seat member 352 is limited by the engagement of its bottom annular end shoulder 357 with the upwardly facing annular shoulder 358 of the internal annular bottom end flange 359 of the bottom housing section 307. The lower end portion of the lower seat member is provided with slots 360 to facilitate transmission of fluid pressure from the longitudinal passage 361 of the bottom housing section to the piston chamber 318.

The lower end portion of the piston is telescoped over the upper end portion of an actuator sleeve 364 disposed about the lower seat member. The bottom end shoulder 361 of the piston engages the upwardly facing annular shoulder of the external intermediate flange 366 of the actuator sleeve. The lower portion of the actuator sleeve below its external flange extends into a latch ring 369 of a detent or quick release assembly which includes a plurality of latch balls 367 movably positioned in downwardly and inwardly extending circumferentially spaced lateral bores 368 of the latch ring which extends through the upper portion of the internal annular flange 369 of the latch ring.

The lower portions of the latch balls engage the downwardly and inwardly sloping arcuate surfaces 370 defining the lower sides of latch ring bores and their top surfaces are engaged by the bottom end surface or shoulder 371 of the actuator sleeve. The inner portions of the latch balls, when the valve is in its open position, are received in an external annular latch recess 374 of the bottom seat member and engage the downwardly and outwardly inclined or extending annular cam shoulder 375 defining the lower end of the latch recess. The latch ring, and therefore the actuator sleeve 364 and the piston 342, is biased upwardly in the housing by a spring 377 whose upper end portion bears against the annular bottom end shoulder or surface 378 of the latch ring and whose bottom portion bears against an annular upwardly facing shoulder 379 of the bottom housing section.

The piston has a pair of longitudinally extending circumferentially spaced slots 381 and 382 in which are located operator members 382 and 383, respectively, which are in the form of segments of a cylinder. The operator members have radially inwardly extending pivot pins 385 and 386 which are received in the bores 388 and 389, respectively, of the ball 352. The ball 352 is identical in structure with the ball 82 of the valve 50, the central longitudinal axes of its bores 388 and 389 lying in a plane which extends at an angle of 30 degrees relative to the plane in which lies the central axis X—X of the ball which extends perpendicularly relative to the central longitudinal axis of the axial passage 390 of the ball. The central longitudinal axes of the bores of the balls are spaced 110 degrees relative to the center of the ball. The pivot pins 385 and 386 have spherical surfaces which engage the surfaces of the ball defining its bores 388 and 389.

Internal cam flanges 392 and 393 at the lower end of the operator member 382 extend on opposite sides of a vertical spacer bar or portion 394 of the actuator sleeve into the circumferentially spaced windows 395 and 396 thereof. When the piston and the actuator sleeve are in their lowermost positions in the housing, illustrated in FIGURES 25 and 31, the bottom surface of the cam flange 393 is engageable with the upwardly facing shoulder 397 provided by the large lower portion of the spacer bar 394 and its left side surface is engageable with the vertical right side shoulder of the bar portion above the shoulder 397 whereby the engagement of these shoulders of the cam flange 393 with these shoulders of the actuator sleeve prevents upward movement of the actuator sleeve relative to the operator member 382 and also prevents counterclockwise rotational movement, FIGURE 27, of the operator member 382 relative to the actuator sleeve. When the actuator sleeve is in its uppermost position relative to the operator member 382 illustrated in FIGURES 24 and 32, the left side surface of the cam flange 393 is adapted to engage the vertical right shoulder of the spacer bar 394 below the shoulder 397 to thereafter prevent counterclockwise rotational movement of the operator member relative to the actuator sleeve and the right side surface of the cam flange 392 is then adapted to engage the left shoulder or surface of the spacer bar 394 to prevent clockwise rotational movement of the operator member relative to the actuator sleeve. The engagement of the bottom shoulders of the cam flanges 392 and 393 with the upwardly facing shoulders 401 and 402 of the actuator sleeve defining the lower ends of the windows 395 and 396 limits upward movement of the actuator sleeve relative to the operator member 382.

The operator member 383 similarly has a pair of internal cam flanges 404 and 405 which extend inwardly on opposite sides of the spacer bar or portion 406 of the actuator sleeve into the windows 396 and 407, respectively, of the actuator sleeve. When the actuator sleeve is in an upper position in the housing, illustrated in FIGURES 24 and 32, the engagement of the top surface of the cam flanges 404 with the downwardly facing shoulder 409 of the actuator sleeve provided by the enlarged upper portion of its spacer bar or portion 406 limits downward movement of the actuator sleeve relative to the cam flange 404 and the engagement of its right surface or shoulder with the left side surface or shoulder of the spacer bar below its downwardly facing shoulder 409 prevents clockwise circumferential movement, FIGURE 32, of the operator member 383 relative to the actuator sleeve. When the actuator sleeve is in an upper position relative to the operator member 383, the engagement of the facing side surfaces of the cam shoulders 404 and 405 with the side surfaces of the spacer bar 406 above its downwardly facing shoulder 409 limits circumferential movement of the operator member 383 in either direction relative to the actuator sleeve. The bottom surfaces of the cam flanges 404 and 405 are adapted to engage the upwardly facing shoulders 402 and 410 of the actuator defining the lower ends of the windows 396 and 407, FIGURE 32, to limit upward movement of the actuator sleeve relative to the operator members when the actuator sleeve is in its upper position relative to the operator members. Downward movement of the actuator sleeve relative to the operator members is limited by the engagement of its downwardly facing shoulder 412, 413, and 414, defining the upper ends of the windows 395, 396 and 407, respectively.

In use, the valve 300 is installed in the bottom end of a string of tubing which is then lowered into the well and a packer above the valve is then set in anchored and sealing position closing the annulus between the string of tubing and the well casing. Assuming now that the valve is open, well fluids under pressure then flow upwardly through the passage 361, the passage 426 of the lower seat member, the passage 390 of the ball, the passage 340 of the upper seat member, the passage 338 of the bean 330 and the passage 339 of the upper housing member 303 into the lower end of the tubing. The pressure upstream of, or below, the bean is of course higher than downstream of, or above, the bean due to the restricted orifice of the bean. The downstream pressure is exerted on the upwardly facing surfaces of the piston which extend outwardly at the line of sealing engagement of the O-ring 345 with the top housing section, such downstream pressure being communicated to the top end of the chamber 318 through the slots 360 of the lower housing member and the annular space or passage between the bottom housing section and the lower seat member and the piston. This downstream pressure also acts on the downwardly facing surfaces of the piston lying outwardly of the line of sealing engagement of the O-ring 347 with the piston seal surface 348. Since the area of the downwardly facing surfaces of the piston exposed to the downstream pressure is considerably smaller than the area of its upwardly facing areas exposed to the downstream pressure, the downstream pressure exerts a downwardly acting force on the piston tending to move it downwardly in the housing.

The pressure in the passage 339 of the top housing section downstream of or above the bean 330 is exerted on the downwardly facing surface of the internal piston flange 344 between the line of sealing engagement of the O-ring 347 with the piston seal surface 348 and the line of sealing engagement of the O-ring 345 with the top housing section. The area of this downwardly facing surface of the piston flange is equal to the difference between the areas of the upwardly and downwardly facing surfaces of the piston exposed to the fluid pressure from below the bean 330 and, if there were no flow through the valve when it is open and thus the pressures upstream and downstream of the bean are equal, the fluid pressures acting on the piston would be balanced and the piston would not be moved in either direction due to the force of fluid pressures exerted thereon. The piston is then held in its upper position by the upward force exerted thereon by the force of the spring 377.

When the ball 352 is in its open position and the piston is in its upper position, downward movement of the piston is resisted not only by the force exerted thereon by the spring 377 but also by the inwardly directed force exerted on the latch balls 367 due to their camming engagement with the shoulders 371 of the latch ring and which resists outward and upward movement of the latch balls in the bores 368 of the latch ring.

When fluids are flowing upwardly through the valve, the difference between the forces exerted on the piston fluid by the fluid pressure upstream and downstream of the bean causes a downward force to be exerted thereon which tends to move it downwardly. As long as the pressure differential across the bean does not exceed a predetermined value, the force of the spring 377 which resists downward movement of the piston and the force exerted by the camming engagement of the latch balls 367 with the cam surfaces 371 of the bores of the latch ring which holds the piston and the actuator sleeve against downward movement. If for some reason, as, for example, a failure of surface equipment which controls the flow of fluids from the string of tubing at the surface which permits unrestricted flow of fluids from the string of tubing at the surface, the pressure downstream of, or above, the bean decreases and the force which it exerts on the downwardly facing surface of the piston flange now decreases and the downward force exerted on the piston by the upstream pressure is now sufficiently great to cause the camming engagement of the shoulder 375 with the latch balls to move them outwardly out of engagement with the shoulder 375. The latch ring moves downwardly against the resistance of the spring 377 to permit such outward and upward movement of the latch balls in the bores 368. As soon as the latch balls move out of engagement with the shoulder 375 of the lower seat member, they are no longer effective to resist downward movement of the latch ring, the actuator sleeve and the piston in the housing since they now merely roll along the outer surface of the lower seat member. The piston, the actuator sleeve and the latch ring now move swiftly downwardly in the housing from the position illustrated in FIGURE 24 to the position illustrated in FIGURE 25, such downward movement then being resisted only by the force of the spring 377.

During the first portion of the downward movement of the actuator sleeve, the operator member 382 is held against circumferential movement in a clockwise direction relative to the actuator sleeve due to the engagement of the facing side surfaces of its cam flanges 392 and 393 with the opposite side surfaces of the spacer bar 394 of the actuator sleeve below its shoulder 397 and, since no downwardly facing surface of the actuator sleeve engages either of its cam flanges, the operator member 382 remains stationary during the first portion of the downward movement ends when the top surfaces of its cam flanges are engaged by the downwardly facing shoulders 412 and 413 of the actuator sleeve. During this first portion of the travel of the actuator sleeve and piston, the engagement of the shoulder 409 of the spacer bar 406 with the top surface of the cam flange 404 causes downward movement of the operator member 383 and, since the operator member 382 is now stationary, its circumferential movement in a counterclockwise direction, FIGURE 27, so that the ball is rotated about the axis Y—Y which is the central longitudinal axis of the bore 388 of the ball. Upon the completion of this first portion of upward movement, the top surface of the cam flange 404 moves out of engagement with the shoulder 409 and simultaneously the shoulders 412 and 413 of the actuator sleeve engage the top surfaces of the cam flanges 392 and 393 of the operator member 382. Further downward movement of the piston and the actuator sleeve now causes downward movement of the operator member 382 and the operator member 383 is then held against circumferential movement relative to the actuator sleeve due to the engagement of the facing shoulders of its cam flanges 404 and 405 with the upper portion of the spacer bar 406 above its shoulder 409. The operator member 382 however may now move circumferentially in a counterclockwise direction since its bottom surface is now above the upwardly facing shoulder 397 of the other spacer bar 394 of the actuator sleeve.

During this second or intermediate portion of the downward movement of the piston and the actuator sleeve, the ball will therefore rotate about the axis Z—Z which is the central longitudinal axis of the bore 389, the operator member 382 being moved downwardly and circumferentially in a counterclockwise direction until the shoulders 413 and 414 defining the top ends of the windows 395 and 407 engage the top surfaces of the cam flanges 404 and 405. At this time further downward movement of the piston sleeve will cause downward movement of both actuator members. The ball will be rotated during this portion of downward movement of the piston and actuator sleeve about an axis S—S which extends perpendicularly to the axis which bisects the central longitudinal axes of the two central bores, until the ball is moved to the position illustrated in FIGURE 25 and the downward movement of the piston and therefore the actuator sleeve is arrested dut to the engagement of the bottom annular shoulder 416 of the piston flange with the top shoulder 417 of the seat member. As the ball rotates about the axis S—S during this third portion of movement of the actuator sleeve, the movement of the bores 388 and 389 relative to the pivot pins causes the positions of the pins in the bores to be displaced radially outwardly, such relative radial movement of the bores relative to the pivot pins permitting such pivotal movement of the ball as both operator members move downward. The degree of such relative radial movement possible between the bores and the pivot pins may be varied by varying the radius of the spherical portions of the pivot pins relative to the radii of the bores 388 and 389, it being apparent that the greater the difference between these radii, the greater is the possible degree of such relative radial movement and the greater the possible degree of rotation of the ball about the axis S—S. The ball is now in its closed position illustrated in FIGURES 25 and 31 preventing fluid flow through the valve.

If it is thereafter desired to re-open the valve, fluid under pressure is introduced into the tubing string at the surface and as the pressure in the tubing above the valve increases to a value which causes it to exert an upward force on the downwardly facing surfaces of the piston flange 344, which is less than the pressure below the ball but great enough to counterbalance or offset the downward force exerted by the pressure below the ball on the piston to the degree at which the force of the spring 377 is effected to move the piston upwardly, the piston, the latch ring, and the actuator sleeve are moved upwardly from their lowermost positions illustrated in FIGURE 25 to the uppermost positions illustrated in FIGURE 24. It will be apparent that since the latch balls do not exert any appreciable force tending to prevent upward movement of the latch sleeve from its lowermost position to its uppermost positions, the pressure which must be introduced into the string of tubing 301 at the surface to cause the valve to open is appreciably less than the pressure which exists below the ball valve.

Figures 24, 25, 31, 32:
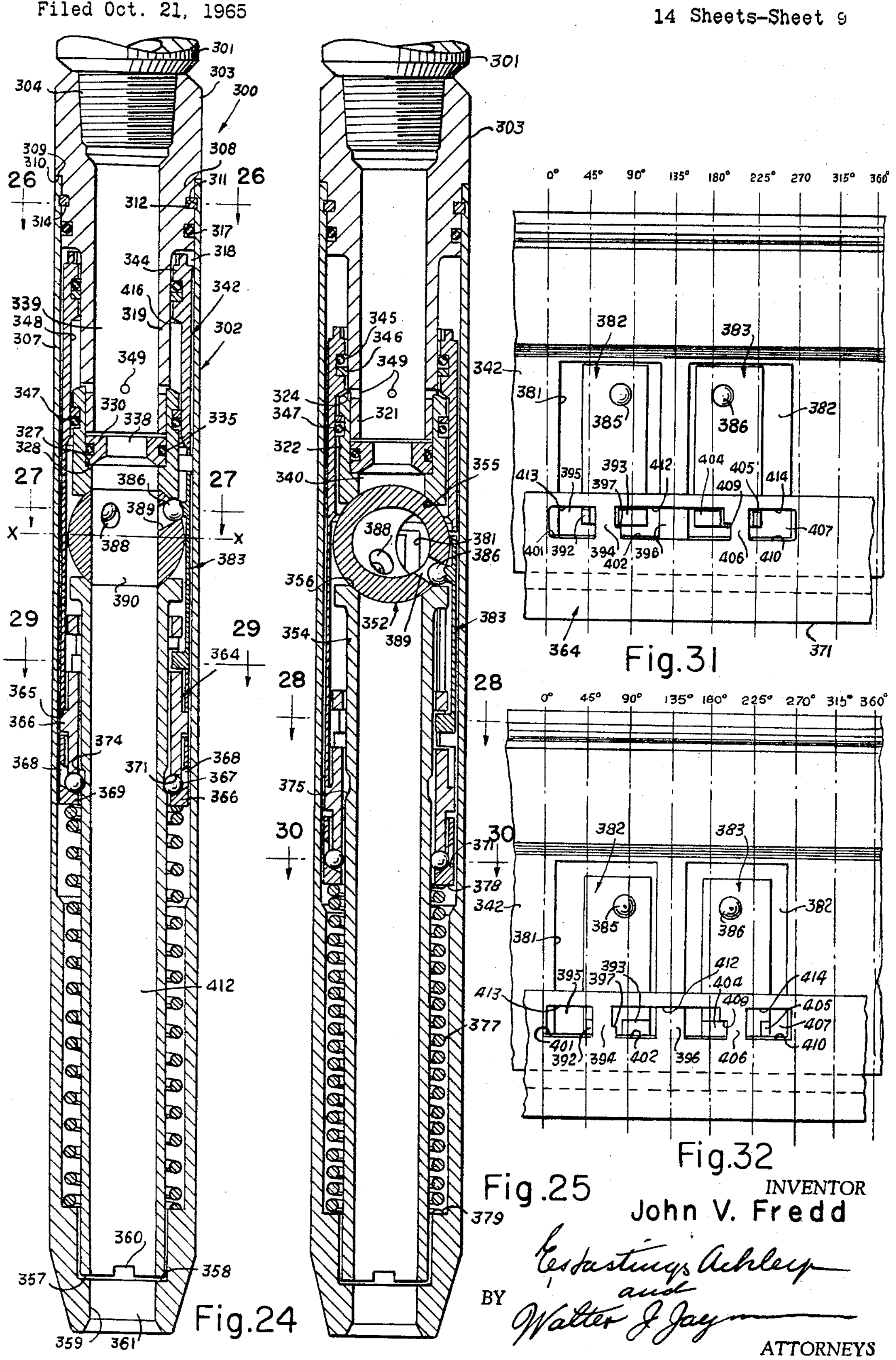
FIGURE 24 is a vertical sectional view of a valve embodying the invention, whose operation is responsive to the pressure conditions of the fluid whose flow is controlled thereby, showing the valve in its open position.
FIGURE 25 is a view similar to FIGURE 24 showing the valve in its closed position.
FIGURE 31 is an internal planar developmental view showing the position of the operator means of the valve when the valve is in its closed position.
FIGURE 32 is a view similar to FIGURE 31 showing the position of the operator means when the valve is in its open position.
Figures 26, 27, 28, 29, 30, 34, 35:
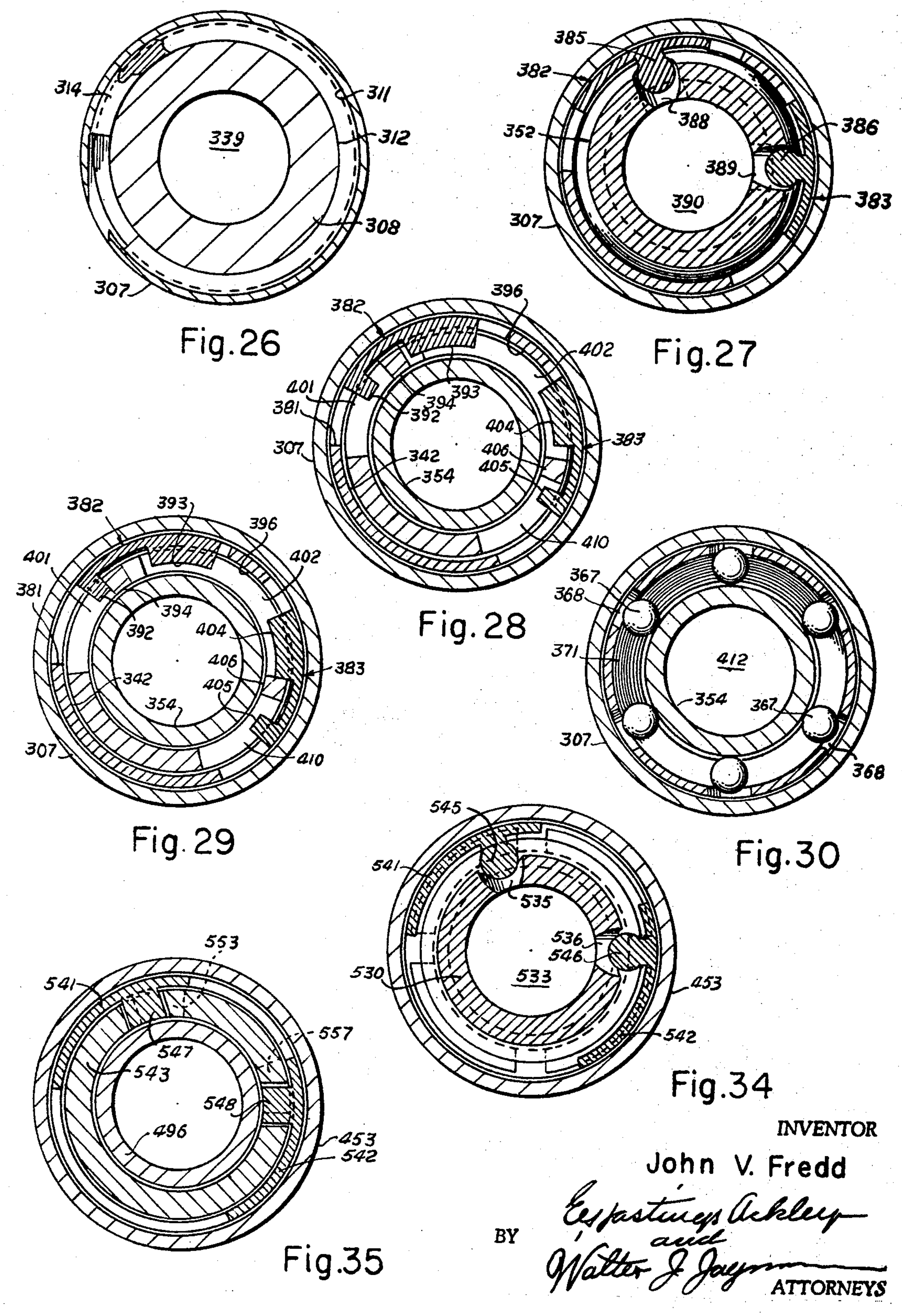
FIGURE 26 is a sectional view taken on line 26—26 of FIGURE 24.
FIGURE 27 is a sectional view taken on line 27—27 of FIGURE 24.
FIGURE 28 is a sectional view taken on line 28—28 of FIGURE 25.
FIGURE 29 is a sectional view taken on line 29—29 of FIGURE 24.
FIGURE 30 is a sectional view taken on line 30—30 of FIGURE 25.
FIGURE 34 is a sectional view taken on line 34—34 of FIGURE 33.
FIGURE 35 is a sectional view taken on line 35—35 of FIGURE 33.

During the first portion of the upward movement of the actuator sleeve and the piston, from the position illustrated in FIGURE 31, and at the end of which the bottom surfaces of the cam flanges 404 and 405 of the operator member 383 are engaged by shoulders 399 and 410 of the actuator sleeve, the operator member 383 is held against circumferential movement due to the engagement of the facing side surfaces of its cam flanges 404 and 405 with the side surfaces of the spacer bar 406 above its downwardly facing shoulder 409 and the operator member 383 will thus be stationary since no upward force is imparted thereto by actuator sleeve. The operator member 382 however will be moved upwardly and circumferentially in a clockwise direction due to the engagement of the bottom surface of its cam flange 393 with the upwardly facing shoulder 397 of the spacer bar 394 and the ball is rotated about an axis Z—Z which is the central longitudinal axis of the bore 389 until the cam flange 393 moves out of engagement with the shoulder 397. At this time the bottom surfaces of the cam flanges 404 and 405 of the other operator member are engaged by the bottom shoulders 399 and 410 of the spacer sleeve defining the lower end of the windows 396 and 407. During the second portion of the upward movement of the actuator sleeve, the operator member 382 is held against circumferential movement relative to the actuator sleeve due to engagement of the facing shoulders of its cam flanges 392 and 393 with the side surfaces or shoulder of the spacer bar 394 below its shoulder 397 and no upward force is imparted thereto by the actuator sleeve. During the second portion of the upward movement of the actuator sleeve, the operator member 383 is moved upwardly and circumferentially in a clockwise direction and the ball is rotated about the central longitudinal axis of its bore 388 since the operator member 382 is now stationary. Such rotation of the ball about the central longitudinal axis of its bore 388 continues until the upwardly facing shoulders 401 and 399 of the actuator sleeve defining the lower ends of the windows 395 and 396 engage the bottom surfaces of the cam flange 401 and 402 of the actuator sleeve whereupon during the next third portion of the upward movement of the actuator sleeve both operator members 382 and 383 are moved upwardly and the ball is rotated about an axis which is perpendicular to the axis bisecting the angle between the central longitudinal axes of the bore of the ball.

It will thus be apparent that during the movement of the ball between its open and closed positions, the ball is rotated first about one axis, then about another and finally about a third and the axial axis of its passage 390 is displaced a full 90 degrees.

It will also be apparent that while in the valve discussion the movement of the ball has been described as a rotation first about one stationary axis, then a second stationary axis and finally about a third stationary axis, it is possible for the ball to rotate during any one of the three portions of the longitudinal movement of the actuator sleeve in either direction, about an axis which itself may be moving. For example, when the actuator sleeve moves upwardly from its lowermost position illustrated in FIGURE 31, the actuator sleeve will not prevent downward or upward movement of the operator member although it prevents its circumferential movement so that while the ball will rotate about the central axis of the bore 389, this axis itself may be moving vertically in the housing due to the various frictional forces resisting movement of the ball, the operator members and the actuator sleeve. In addition, while it was presumed that the actuator sleeve itself did not rotate, it can rotate about the lower seat member, and any such rotation of the actuator sleeve during its longitudinal movement will of course cause the ball to rotate about an axis which itself is in motion.

It will be apparent that the pressure differential across the valve may always be such that the pressure in the tubing above the valve is always less than the pressure therebelow, that the valve will close when the pressure differential drops below a first predetermined value and that the valve will again open when the pressure differential is again raised to a second predetermined value which is smaller than the first predetermined value at which the valve closes due to the provision of the quick release or detent means which resists downward movement of the piston until the latch balls are moved out of engagement with the shoulder 375 of the lower seat member and which does not exert any appreciable force resisting movement of the actuator sleeve and piston from its lowermost position to its uppermost.

It will now be seen that the ball 352 of the valve 300, like the balls of the valves 50 and **50*a***, is rotated about more than one axis and actually about three axes, that it will rotate sequentially about first, second and third axes if the actuator sleeve does not rotate, since the actuator sleeve and the operator members have means preventing circumferential movement of the two operator members during various different portions of the longitudinal movement of the actuator sleeve between its uppermost and lowermost positions.

It will also be seen that if the actuator sleeve itself rotates during a particular portion of its longitudinal movement, the axis about which the ball is rotated at that time will itself be moving. For example, if the actuator sleeve rotates in a clockwise direction as it moves upwardly from its lowermost position illustrated in FIGURE 31, the operator member 382 will be moved upwardly due to the engagement of the bottom surface of its cam flange 393 with the shoulder 397 of the spacer bar 394 and simultaneously the operator member 383 will be moved circumferentially in a counterclockwise direction due to the engagement of the left side shoulder or surface of its cam flange with the right side shoulder or surface of the spacer bar 406. Due to this simultaneous movement of the two operator members, the ball will rotate about an axis which itself is moving.

It will now be seen that a new and improved valve 300 has been illustrated and described which may be employed to prevent flow of fluid through a flow conductor such as a string of tubing when the pressure differential across the valve exceeds a predetermined value and that the valve may be easily re-opened by increasing the fluid pressure upstream of the valve.

It will also be seen that, if desired, fluids may be pumped downwardly through the valve since the valve will remain open as long as pressure upstream of the valve does not exceed the pressure downstream thereof by a predetermined amount.

Referring now particularly to FIGURES 33 through 37 of the drawings, the valve 450 embodying the invention includes a housing 450 having a top section 452, a middle section 453 and a bottom section 454. The upper end portion of the middle housing section 453 is telescoped over an intermediate reduced portion 456 of the top housing section and is secured thereto by a retainer wire 457 whose inner portions extend into an outer external annular recess 458 of the top section and whose outer portions extend into the internal annular recess 459 of the middle housing section. The middle housing section has an outwardly opening slot (not shown) which opens from the exterior to the internal annular recess 459 through which the retainer wire may be inserted into the two aligned recesses. The bottom housing section telescopes into the section threadedly secured thereto, as at 461. A lock nut 462 may also be threaded on the bottom mandrel section to lock the middle mandrel section to the bottom section.

The intermediate portion 456 of the top housing section is provided with an external annular recess in which is disposed an O-ring 464 which seals between the top and middle housing sections. Back-up rings 466 for the O-ring may also be disposed in this external recess of the top housing section. The bottom end portion 467 of a lock mandrel assembly 428 by means of the valve is secured in a string of tubing, may be threadedly secured to the top housing section as at its internally threaded top end portion 469.

The top housing section has a dependent tubular extension 470 of reduced external diameter and the longitudinal passage 472 of the top housing section is enlarged at the lower end portion of the dependent extension to provide a downwardly facing annular shoulder 475 which engages the top end shoulder or surface 476 of a flow restricting tubular member, or bean 477 to limit its upward movement therein. The bean has an external annular flange 479 provided with an external recess in which is disposed an O-ring 480 which seals between the bean and the dependent extension.

The reduced upper end portion 482 of a tubular upper seat member 483 is telescoped between the lower end portion of the bean 477 and the lower end portion of the dependent extension. The engagement of the top annular end surface of the upper seat member with the annular bottom shoulder of the flange 479 of the bean 477 limits downward movement of the bean relative to the upper seat member. The upper seat member and the bean are provided with aligned radial apertures or ports 485 and 486 through which fluid may flow into an annular chamber 488 between the upper seat member and a tubular piston 489.

The tubular piston has an upper internal annular recess in which is disposed an O-ring 491 which engages the seal surface 492 of the dependent extension 470 of the top housing section to seal between the piston and the housing section above the ports 485 of the upper seat member. Back-up rings 494 are preferably disposed in the recess on opposite sides of the O-ring. The piston also is provided with an external annular recess in which is disposed an O-ring 495 which seals between the piston and the external seal surface 496 of the upper seat member below the ports 485. Back-up rings 497 are preferably provided in the recess for the O-ring. The bean is also provided with an O-ring 499 disposed in an annular external recess thereof for sealing between the bean and the upper seat member below its ports 486.

The piston is biased downwardly in the housing by a spring 501, disposed about the dependent extension 470 of the top housing section, whose upper end bears against the downwardly facing annular shoulder 502 of the top housing section and whose lower end bears against the top end surface or shoulder 504 of a latch sleeve or ring 505 of a detent or quick release assembly 506. The detent assembly includes a plurality of latch balls 508 movably disposed in the radial bores 509 of the latch sleeve and biased inwardly into an external latch recess 511 of the dependent extension due to their camming engagement with the upwardly and inwardly inclined or extending arcuate surfaces 512 of the latch sleeve which define the upper portions of the bores 509. The piston has a reduced upper end portion 515 whose top end shoulder or end surface 516 engages the bottom surfaces of the latch balls. The inner portions of the latch balls are engageable with the upwardly and outwardly extending or inclined annular cam shoulder 518 of the dependent extension defining the upper end of the latch recess so that the piston may not move upwardly in the housing until the latch balls are moved outwardly out of the latch recess 511 and out of engagement with the cam shoulder 518.

A lower tubular seat member 520, whose lower portion is telescoped in the upper enlarged portion 521 of the bore or passage 523 of the bottom housing section has an external annular flange 524 whose bottom annular shoulder 523 engages the upwardly extending circumferentially spaced radial ribs or lugs 525 of the bottom housing section to limit its downward movement in the housing. The spaces between the ribs provide passages through which fluid pressure downstream of the lower seat member is communicated to the external surfaces of the piston above and below the O-rings 491 and 495. The lower seat member is of smaller external diameter than the large portion 521 of the bore and its lower end does not engage the shoulder 527 of the bottom housing section so that fluid may flow externally of the lower seat member in the housing.

A ball 530 is rotatably disposed between the upper and lower seat members with its outer spherical surface in engagement with the spherical seat surfaces 531 and 532 of the upper and lower seat members, respectively. The ball may be identical in structure with the ball 82 of the valve 50 and have an axial passage 533 and a pair of radial bores 535 and 536, respectively, whose central longitudinal axes are spaced at an angle of 110 degrees relative to each other and lie in a plane which extends at an angle of substantially 30 degrees relative to the plane in which lies the central axis X—X of the ball which is perpendicular to the central longitudinal axis of the axial passage of the ball.

A pair of operator members 541 and 542, which are segments of a cylinder, are disposed outwardly of the reduced lower end actuator sleeve section 543 of the piston and have inwardly extending pivot pins 545 and 546 which are disposed in the bores 535 and 536, respectively, of the ball. The operator members also have inwardly extending pins 547 and 548, respectively, which are received in the windows or apertures 549 and 550, respectively, of the actuator portion of the piston.

Figures 33, 36, 37:
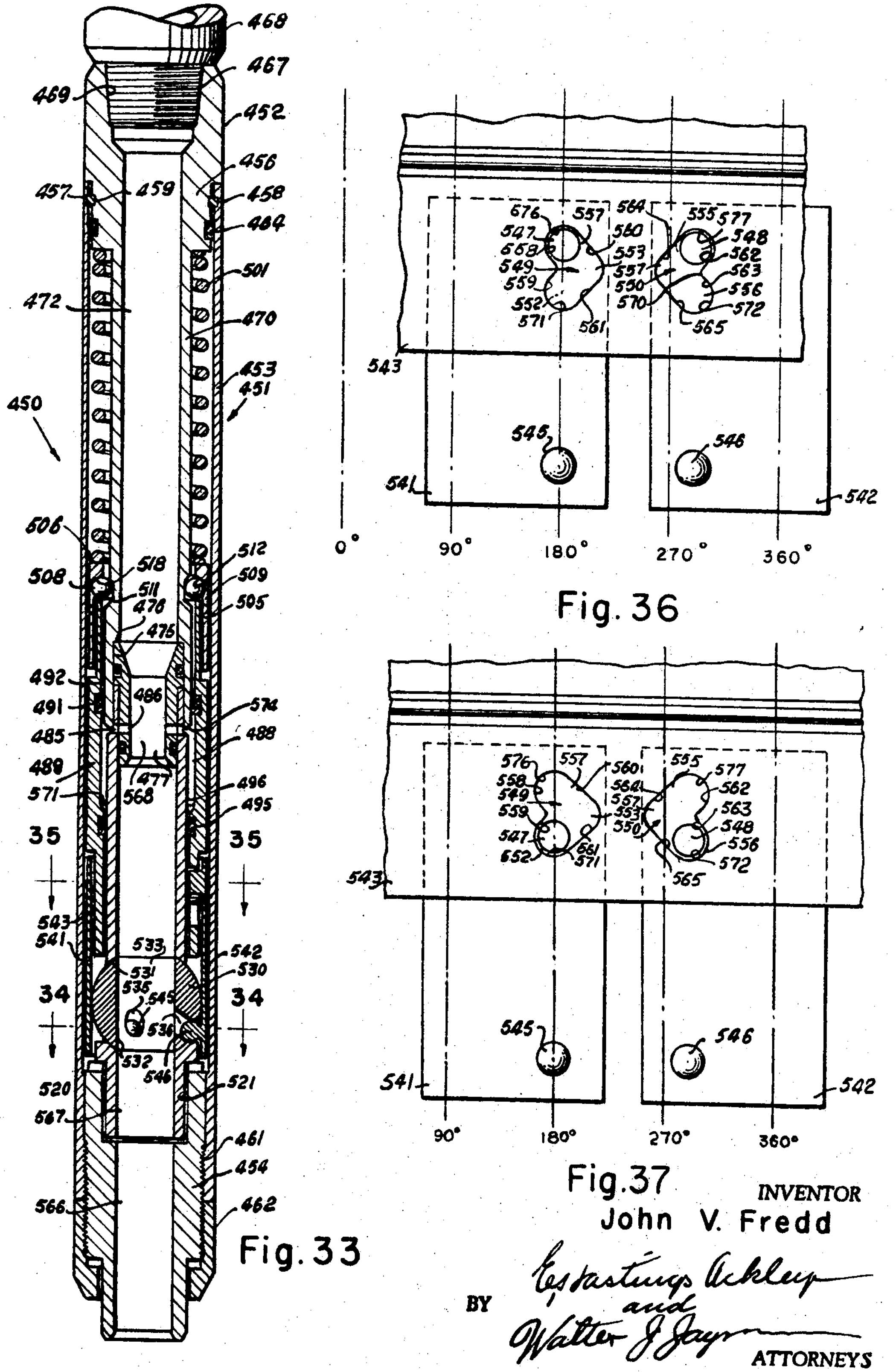
FIGURE 33 is a vertical sectional view of a modified form of the valve embodying the invention.
FIGURE 36 is an internal planar developmental view showing the position of the operator means of the valve illustrated in FIGURES 33 through 35 when the valve is in its open position.
FIGURE 37 is a view similar to FIGURE 36 showing the position of the operator means when the valve is open.

The window 549 is substantially L-shaped having an upper leg portion 551 and a lower leg portion 552 which extend divergently from its middle portion 553 and to the left as seen in FIGURES 36 and 37. The window 549 is of similar L-shape having an upper leg portion 555 and a lower leg portion 556 which extend divergently and to the right, as seen in FIGURES 36 and 37, from its middle portion 557. When the valve is in its open position the piston is in its lowermost position illustrated in FIGURES 33 and 36, the cam pins 547 and 548 of the operator members are disposed in the upper leg portions 551 and 555, respectively, of the windows.

The window 552 is defined by the surfaces of camming shoulders 558 and 559 which converge toward each other and to the right and by camming shoulders 560 and 561 which extend substantially parallel to the shoulders 558 and 559, respectively, and also converge to the right as seen in FIGURE 37. The window 550 similarly is defined by a pair of cam shoulders 562 and 563 which converge to the left as seen in FIGURE 37 and with cam shoulders 564 and 565 which extends substantially parallel to the shoulders 562 and 563, respectively, and also converge toward the left. In use, assuming that the housing 451 is connected to the lower end of the lock mandrel assembly 468 and is installed in a string of tubing and the valve is in its open position with fluid flowing upwardly through the passage 566 of the bottom housing section, the passage 567 of the lower seat member, the axial passage 533 of the ball, the passage 568 of the bean 477 and the passage 472 of the top housing section, fluid pressure downstream of or below the bean 477 is communicated to the downwardly facing surfaces of the piston extending outwardly of the line of sealing engagement of the O-ring 495 with the seal surface 496 of the upper seat member and also to the upwardly facing surfaces of the piston which lie outwardly of the line of sealing engagement of the O-ring 491 with the seal surface 492 of the top housing section. Since the diameter of the seal surface 496 is smaller than the diameter of the seal surface 492, the area of these upwardly facing surfaces of the piston is smaller than the area of these downwardly facing surfaces of the piston exposed to such downstream pressure and such downstream pressure therefore exerts a force on the piston tending to move it upwardly against the resistance of the spring 501 and also of the force tending to hold the latch balls against outward movement in the bores 509 of the latch sleeve.

The pressure within the passage 568 of the bean 477, communicated to the passage 488 through the ports 486 and 485 of the bean and of the upper seat member, is exerted on the upwardly facing surfaces of the piston between the line of sealing engagement of the O-ring 491 with the seal surface 492 and the line of sealing engagement of the O-ring 495 with the seal surface 496 of the upper seat member. It will be apparent that due to the well known Venturi effect, the greater the velocity of flow of fluids through the bean passage, the lower will be the pressure in the chamber 488. When the fluid is flowing upwardly through the valve to the tubing at a normal or safe rate, the combined force of the spring 501, of the latch device 506 and of the pressure within the chamber 488 is sufficient to counterbalance the upward force exerted on the piston 489 by the pressure upstream of the lower seat member. If this rate of flow through the valve increases, due to an abnormal condition as, for example, failure of control equipment at the surface of the well or damage to the string of tubing which permits unrestricted flow of fluids through the tubing, the velocity of flow of the fluid through the bean increases rapidly and the pressure within the chamber 488 drops. The downstream pressure is then effective to move the piston upwardly. As the piston moves upwardly, the balls are cammed outwardly due to their engagement with the upwardly and outwardly extending annular shoulder 518 defining the upper end of the latch recess 511 and, as the latch balls moves out of engagement with the shoulder 518, the force resisting upward movement of the piston is decreased substantially and abruptly so that the piston now moves rapidly upwardly against the force exerted thereon by the spring 501 and the pressure within the chamber 488.

As the plunger moves upwardly, the camming engagement of the actuator sleeve section shoulders 558 and 562 with the actuator pins 547 and 548, respectively, tends to move both operator members upwardly and circumferentially towards each other. Since the pivot pins 545 and 546 are in the bores 535 and 536, their movement toward each other, and therefore of the operator members circumferentially toward each other, is limited due to their engagement with the internal surfaces of ball defining the radial bores thereof. Assuming now that the frictional forces resisting the rotation of the ball about the axis Z—Z, which is also the central longitudinal axis of the bore 536, are greater than the frictional forces resisting rotation of the ball about the axis Y—Y, which is the central longitudinal axis of the bore 535, upward movement of the piston will cause the operator member to move upwardly with the piston while the cam pin 547 and the operator member 542 will be moved circumferentially in a counterclockwise direction, FIGURE 34. The ball will be rotated about the axis Y—Y which itself is moving. As the piston continues to move upwardly and when the pin 547 moves out of engagement with the shoulder 558 of the piston, the cam pin 548 will then be free to move in a clockwise direction, FIGURE 34, in the housing and the ball will then be rotated about the axis Z—Z since the operator member 542 will now tend to be stationary. As upward movement of the piston continues the cam pin 546 moves out of engagement with the shoulder 562 and the shoulder 561 will move into engagement with the cam pin 547 whereupon continued upward movement of the piston will cause the operator member 541 to be moved upwardly and in a counterclockwise direction while the operator member 541 remains stationary since it now engages the shoulder 570 at the juncture of the shoulders 562 and 563 thus causing the ball to pivot about the central longitudinal axis Z—Z of the bore 535. When the counterclockwise movement of the connector pin 547 in the window is arrested due to its engagement with the arcuate shoulder 571 defining the end of the leg portion 552 of the window 549, the shoulder 565 will engage the cam pin 548 and will cause the cam pin 548 and the operator member 542 to move in counterclockwise direction again rotating the ball about the axis Z—Z until the pins are positioned in the leg portions 552 and 565 of the window with the pins 557 and 548 engaging the shoulders 571 and 572 defining the ends of the lower leg portions 552 and 556 of the window. Continued further upward movement then moves the ball about the axis S—S, which is perpendicular to the axis which bisects the angle of the axes Y—Y and Z—Z, until the ball moves to its fully closed position and further upward movement of the piston is arrested by the engagement of its shoulder 573 with the shoulder 574 of the dependent extension 470.

In the above discussion of the closing of the valve, it was assumed that at various times during the upward movement of the piston one operator member was stationary while the other moved. In actual practice, both may be moving at the same time at any one moment of such upward movement depending on the frictional forces resisting rotation of the ball about its various axes so that the ball may at any one movement be rotating about an axis which itself is moving until the movement of the operator members is arrested due to the movement of the cam pins 546 and 547 into the lowermost ends of the windows of the piston.

It will be apparent that when the ball is in its closed position and it is desired that the valve be opened, the pressure in the spring of tubing is increased as by pumping fluid thereinto at the surface until the combined force of such pressure above the ball and of the spring 501 exceeds the upward force exerted on the piston by the pressure below the ball whereupon the piston will be moved downwardly. As the piston moves downwardly the operator members will move from the positions illustrated in FIGURE 37 to the positions illustrated in FIGURE 36, one of the cam pins 547 or 548 due to the camming engagement of the shoulder 559 or 562 moving circumferentially while the other moves vertically with the piston. For example, during the downward movement of the piston, if the cam pin 547 is moved downwardly with the piston, the cam pin 548 will move circumferentially in a counterclockwise direction, then the cam pin 547 will move in a clockwise direction, then the cam pin 148 will be engaged by the shoulder 564 and will be moved in a clockwise direction, the cam pin will be engaged by the shoulder 560 and be moved in a counterclockwise direction and finally both pins due to their engagement with the shoulder 576 and 577 defining the upper ends of the windows will be moved simultaneously downwardly. During each movement of the cam pins 547 and 548 and therefore of the operator members 541 and 542, the ball will be rotated, assuming that the other of the operator members is stationary at various times, first about the axis Z—Z, then about the axis Y—Y, and finally about the axis S—S until it is again in the open position illustrated in FIGURE 33. The axes Y—Y and Z—Z may, of course, themselves be moving at various times during the opening of the valve as the ball rotates thereabout.

It will now be seen that the valve 450, like the valve 300, will move to its closed position when the flow of fluids therethrough exceeds a predetermined velocity and may, therefore, be used as a safety valve to prevent flow through a flow conductor when such flow exceeds a predetermined velocity.

It will further be seen that the valve can be opened by increasing the pressure above the closed valve to a value which is less than the value of the pressure therebelow, the difference therebetween being determined by the force exerted on the piston by the spring 501 since the detent device does not exert any substantial force tending to prevent downward movement of the piston from its upper to its lower position.

Referring now particularly to FIGURES 38 through 42 of the drawings, the valve 600 includes a tubular housing 601 having a top section 602, a middle section 603 and a bottom section 604. The top housing section has an upper externally threaded reduced portion 605 by means of which the upper end of the housing may be connected to one section 606 of a flow conductor, such as a string of tubing. The middle housing section has its upper end portion threaded on the reduced lower end portion 608 of the top section and its lower reduced end portion threaded on the upper reduced end portion 609 of the bottom section. The bottom section has a lower reduced threaded end portion 610 which is secured in the top end portion of a lower section 612 of the flow conductor so that the housing constitutes a section of the flow conductor.

A ball valve 615 is movably positioned in the housing between upper and lower seat members 616 and 617. The lower seat member has an annular spherical seat surface 618 which engages the outer spherical surface of the ball and the upper seat member has an annular seat ring 619 mounted in a downwardly opening internal annular recess of the upper seat member whose annular spherical seat surface 622 also engages the outer surface of the spherical outer surface of the ball. An O-ring 623 disposed in a suitable external annular recess of the seat ring seals between the seat ring and the upper seat member.

A tubular piston member 624 threaded on the upper end of the upper seat member has an external annular piston flange 625 which has suitable seal means 627 disposed in external annular recesses thereof which seal between the piston flange and the internal seal surface 629 of the top housing section below its internal downwardly facing annular shoulder 630. The top housing section above its shoulder 630 has internal annular recesses in which are disposed seal means 631 which seal between the piston member and the top housing section. Fluid under pressure is introduceable into the annular chamber 634, between the piston member and the top housing section and between the top housing section shoulder 630 and the top surface of the piston flange 625 through a passage 635 of the top housing section. The lower end of the passage opens to the upper end of the chamber and an elbow connector or fitting 636 is threaded in its upper horizontal portion. A suitable conduit 637 is connected to the elbow fitting through which fluid pressure from the surface of the well, if the valve is connected in a string of well tubing, may be introduced into the chamber 634.

A tubular floating piston 640 includes an upper reduced tubular section 641 and a lower operator section 644 threaded on the lower end of the upper section. The operator section has a dependent extension 645 provided with a pivot pin 646 which extends into the radial bore 647 of the ball 615. The upper piston section has external annular recesses in which are disposed seal means 650 which sealingly engage the seal surface 629 of the top housing section. The upper seat member is provided with external recesses in which are disposed the seal means 652 which seal between the upper seat member and the floating piston below the ports 654 of the upper seat member and through which fluid may flow between the internal passage 656 of the upper seat member and the annular space or chamber 658 between the upper seat member and the top housing section below the piston flange 625.

An operator member 660 has a lower annular portion provided with an internal annular flange 661 and an upwardly extending cylindrical segment 662. The segment 662 has an inwardly extending pivot pin 664 which extends into the other radial bore 667 of the ball 615.

The central longitudinal axes of the bores 667 and 647 lie in a plane which extends at an angle of 30 degrees relative to the central axis of the ball which extends perpendicularly relative to the longitudinal central axis of the axial passage 670 of the ball. The axes of the radial bores extend at an angle of approximately 110 degrees relative to each other.

The lower seat member has a pair of circumferentially spaced columns 668 and 669 which extend upwardly of the ball and between the extension 645 and the segment 662 to engage the upper seat member and limit the movement of the two seat members toward one another so that the ball is not subjected to excessive frictional forces which would tend to prevent its rotation between the two seat surfaces.

Figures 38, 39, 40, 41, 42:
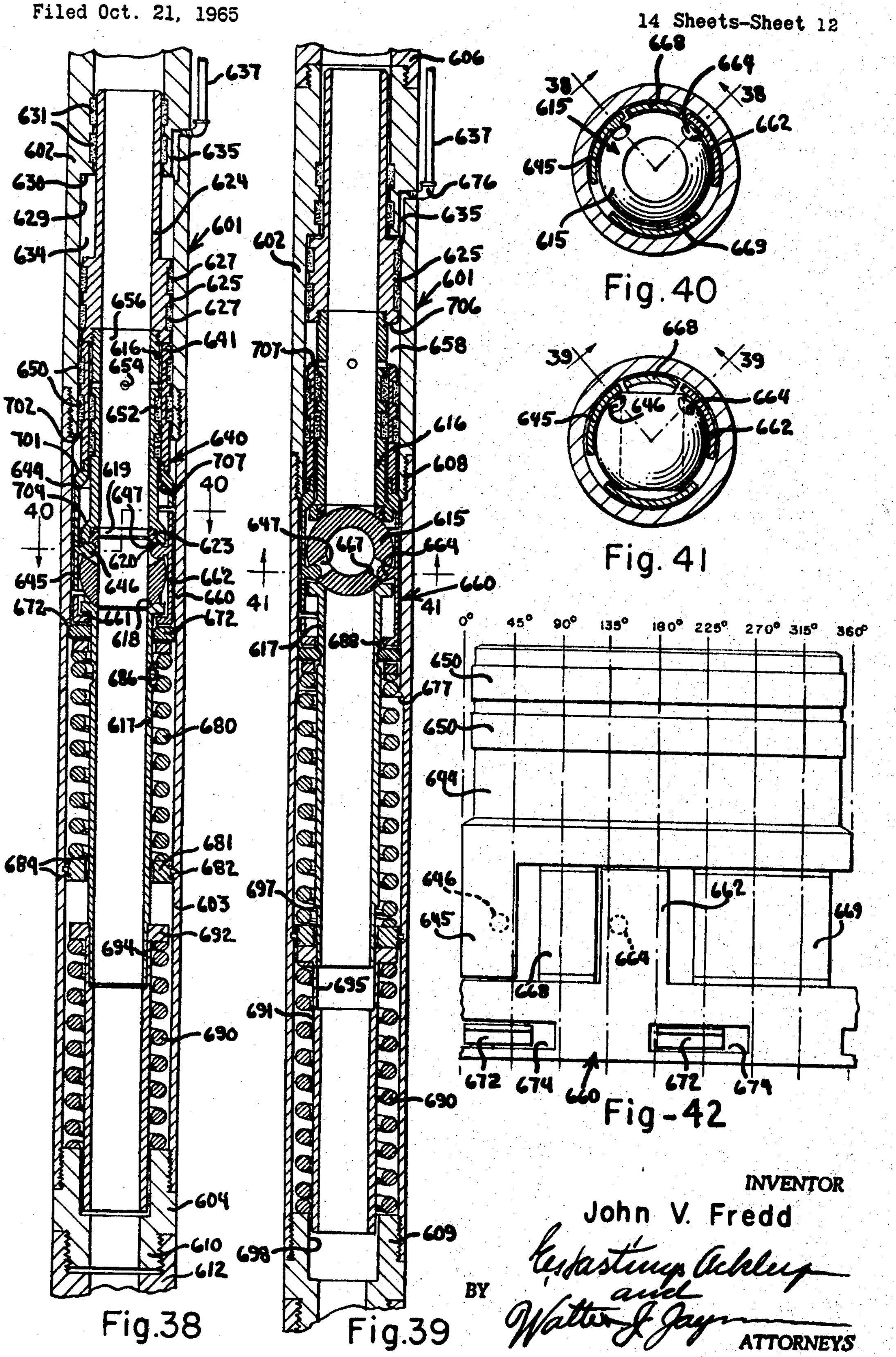
FIGURE 38 is a vertical sectional view taken on line 38—38 of FIGURE 40 of another form of a valve embodying the invention showing the valve in its open position.
FIGURE 39 is a vertical sectional view taken on line 39—39 of FIGURE 41 showing the valve in its closed position.
FIGURE 40 is a sectional view taken on line 40—40 of FIGURE 38.
FIGURE 41 is a sectional view taken on line 41—41 of FIGURE 39.
FIGURE 42 is an external planar developmental view of the operator means of the valve illustrated in FIGURES 38 through 41 showing the position of the operator means thereof when the valve is in its closed position.

When the valve is in its open position illustrated in FIGURE 38, the operator member 660 is releasably held against upward movement in the housing by a pair of ring segments or lugs 672 movably positioned in the circumferential apertures 674 of the operator member whose external downwardly and outwardly extending upper shoulders 675 engage an upwardly and inwardly sloping internal shoulder 677 of the middle housing section and whose inner surfaces engage the outer surface of the lower seat member 617 which limits their inward movement towards their retracted positions. The operator member 660 is biased upwardly by a spring 680 whose upper end portion engages the bottom end surface of the operator member and whose lower end portion engages the top surface of a stop ring 681 secured in the middle housing section by a retainer wire 682 whose inner and outer portions are received in aligned external and internal annular recesses of the retainer ring and the middle housing section. The housing section has a suitable slot which opens to its internal annular recess through which the retainer wire may be inserted into the aligned recesses. The retainer ring also is provided with external annular recesses above and below its external annular recess in which are disposed O-rings 684 which seal between the retainer ring and the middle housing sections above and below the slot of the middle housing section through which the retainer wire is insertable into aligned recesses. The ring segments 672 are movable inwardly into an external annular recess 686 of the lower seat member 617 when the lower seat member moves upwardly and its recess moves into alignment with the ring segments 672, whereupon the upward force exerted on the operator member by the spring 680 and the camming engagement of the shoulder 675 of the segment with the shoulder 677 of the middle housing section causes the ring segments to move inwardly into the recess and out of engagement with the cam shoulder 677 thus freeing the operator member 660 for upward movement in the housing.

The ring segments also have internal upwardly and outwardly extending upper cam shoulders 688 which are engageable with the downwardly and inwardly extending annular upper shoulder or surface 689 of the lower seat member which defines the upper end of the latch recess 686.

When the valve is in the open position illustrated in FIGURE 38 the lower seat member is biased upwardly by a spring 690 disposed about a tubular spring guide 691 whose upper end portion bears against the bottom shoulder of the top external flange 692 of the spring guide and whose lower end portion bears against the top end surface of the bottom housing section 604. The reduced lower end portion 694 of the lower seat member is slidable in the upper enlarged portion 695 of the bore of the tubular spring guide and its downward movement thereinto is limited by the engagement of the downwardly facing external annular shoulder 697 of the lower seat member with the top surface of the spring guide.

The lower end portion of the spring guide is slidably telescoped in the upper enlarged portion 698 of the passage or bore 699 of the bottom housing section. Upward movement of the spring guide is limited by the engagement of its top end surface with the bottom end surface of the retainer ring 681.

Assuming now that the valve is being held in its open position illustrated in FIGURE 38 by the pressure of fluid introduced into the chamber 634 through the conduit 637 against the force of any upwardly acting pressure differential existing across the valve, and the force of the spring 690, if the pressure in the chamber 634 is reduced at the surface by suitable control means associated with the conduit 637, the piston member 624, the upper and lower seat members, the ball and the spring guide will move upwardly. The operator member 660, however, now remains in its lowermost position due to the engagement of the shoulders 675 of the ring segments with the shoulder 677 of the middle housing section. The floating piston 640 will move upwardly with the valve due to the force being exerted on the lower seat member and the spring guide by the spring 690 and also due to the upwardly acting pressure differential, because the pressure in the chamber 658 will now decrease. The ball will rotate about the axis of the radial bore 677 during this movement of the floating piston, the operator member clockwise, FIGURE 40, as required to accommodate such rotation of the ball until the lower seat member moves upwardly to the position wherein its recess 686 moves into alignment with the ring segments 672. At this time the axial passage of the ball will extend at an acute angle to the longitudinal axis of the seat members. As the upper shoulder 689 of the mandrel defining the upper end of the latch recess 688 moves into alignment with inner shoulders 688 of the ring segments, the camming engagement between the shoulders 677 of the middle housing section and shoulders 675 of the ring segments 672, due to the force being exerted on the operator member 660 by the spring 680, causes the ring segments to be moved inwardly into the recess 688. The spring 680 then exerts an upward force on the operator member and the lower seat member due the engagement of the upper internal shoulders 688 of the ring segments with the shoulder 689 of the lower seat member. Substantially at this time, upward movement of the floating piston is arrested due to the engagement of the external shoulder 701 of its operator section 644 with the bottom internal shoulder 702 of the top housing section. Thereafter, the floating piston 644 will be held stationary while the operator member 660, the ball, and the seat members move upwardly and the ball will now be rotated about the axis of the radial bore 647, since the floating piston is now held against upward movement, until the ball is rotated to its closed position wherein its axis passage 647 is out of alignment and communication with the passages of the seat members. During this continued upward and rotational movement of the ball, the operator member will rotate in a counter-clockwise direction, FIGURE 40, as required to accommodate this movement of the ball. When the ball reaches its closed position, the upward movement of the ball and of the upper seat member is arrested due to the engagement of the annular shoulder 704 of the lower seat member with the internal shoulder 705 of the floating piston which is now held against upward movement. It will thus be apparent that during the upward and rotational movement of the ball from its open position to its closed position, the ball rotates first about the axis of one radial bore and then about the axis of the other radial bore.

If it is desired to move the ball to its open position, fluid under pressure is introduced into the chamber 634 through the conduit 637. At this time the pressure in the chamber 658 is lower than the pressure below the ball and therefore the pressure differential across the floating piston will hold it against downward movement. The upper seat member 616 and 617, the ball and the operator member 660 then move downwardly against the resistance of the spring 680 and of the upwardly acting pressure differential across the ball. Since the floating piston is now stationary due to the upwardly acting pressure differential thereacross and since the operator member 660 now moves downwardly with the lower seat member due to the engagement of the shoulders 688 of the ring segments 672 with the shoulder 689 of the lower seat member, the ball will rotate as it moves downwardly about the central longitudinal axis of the radial bore 647 and the operator member 660 will also rotate in a clockwise manner, FIGURE 41, as required. The operator member 660 will continue to move downwardly with the lower seat member until the shoulders 675 of the ring segments 672 move below the housing shoulder 677 whereupon the camming engagement of the ring segment shoulders 688 with the lower seat shoulder 689 cams the ring segments outwardly of the latch recess 688 and the spring 680 is rendered ineffective to resist further downward movement of the lower seat member and, at this time, the shoulder 697 of the lower seat member moves into engagement with the top surface of the spring retainer 691 so that the spring 690 then holds the lower seat member in engagement with the ball. Also at this time, the downwardly facing bottom shoulder 706 of the piston member 624 moves into engagement with the top end shoulder 707 of the floating piston and the floating piston then moves downwardly with the seat members and the ball is rotated about the radial axis of the radial bore 667, since the operator member 660 is now held against downward movement, from its partially closed position to its fully closed position illustrated in FIGURE 39. The operator member 660 will, of course, also rotate in a counter-clockwise direction, FIGURE 41, as required during this second portion of the rotation of the ball about the axis of the radial bore 667.

It will thus be apparent that the ball of the valve 600 will, like the balls of the valves described above, rotate about first one axis and then another during its movement between its open and closed positions and that its movement therebetween may be controlled by fluid pressure which acts on a pressure responsive means, such as the piston member 624.

Referring now particularly to FIGURES 43 through 48 of the drawings, the valve 710 for controlling flow through a flow conductor 711 includes a tubular housing 712 connectable between adjacent sections 713 and 714 of the flow conductor to constitute a section thereof by means of bolts 715 which extend through suitable apertures in the external end flanges of the flow conductor sections into threaded bores 717 of the housing. The upper flow conductor section 713 and the upper end of the valve housing 712 are provided with aligned annular recesses 719 and 720 in which is receivable the usual seal ring 722 which seals therebetween.

A tubular stop member 723 is disposed in the lower end portion of the longitudinal passage 724 of the valve housing and is held against downward movement by a retainer ring 725 threaded in the lower enlarged portion 726 of the housing passage which engages the downwardly facing annular shoulder 727 of the stop member. Upward movement of the stop member in the housing is limited by the engagement of the top surface of its external annular flange 728 with the internal downwardly facing annular facing shoulder 729 of the housing. The valve housing and the stop member define a downwardly opening annular recess 730 which is aligned with an upwardly opening annular recess 731 of the lower flow conductor sections 714 in which the usual seal ring 733 is received and seals between the valve housing and the lower flow conductor section.

A ball 735 and upper and lower tubular seat members 736 and 737 are mounted for movement in the passage of the valve housing. The valve housing has an internal annular recess in the reduced upper portion 737 of its passage 724 in which is disposed a suitable seal means 738 which may include an O-ring and a pair of back-up rings disposed on opposite sides of the O-ring, seals between the upper seat member and the housing. Upward movement of the upper seat member in the housing is limited by the engagement of its annular upwardly facing shoulder 740 with the downwardly facing annular shoulder 741 of the housing. The upper and lower seat members have external annular flanges 744 and 745, respectively, which provide upwardly and downwardly facing shoulders 746 and 747, respectively, which are engaged by the top and bottom internal flanges 748 and 749 of a connector member 750 which may be in the form of a segment of a cylinder and is held against movement out of engagement with the seat member flanges by the internal surfaces of the housing below its shoulder 741.

Figures 43, 44:
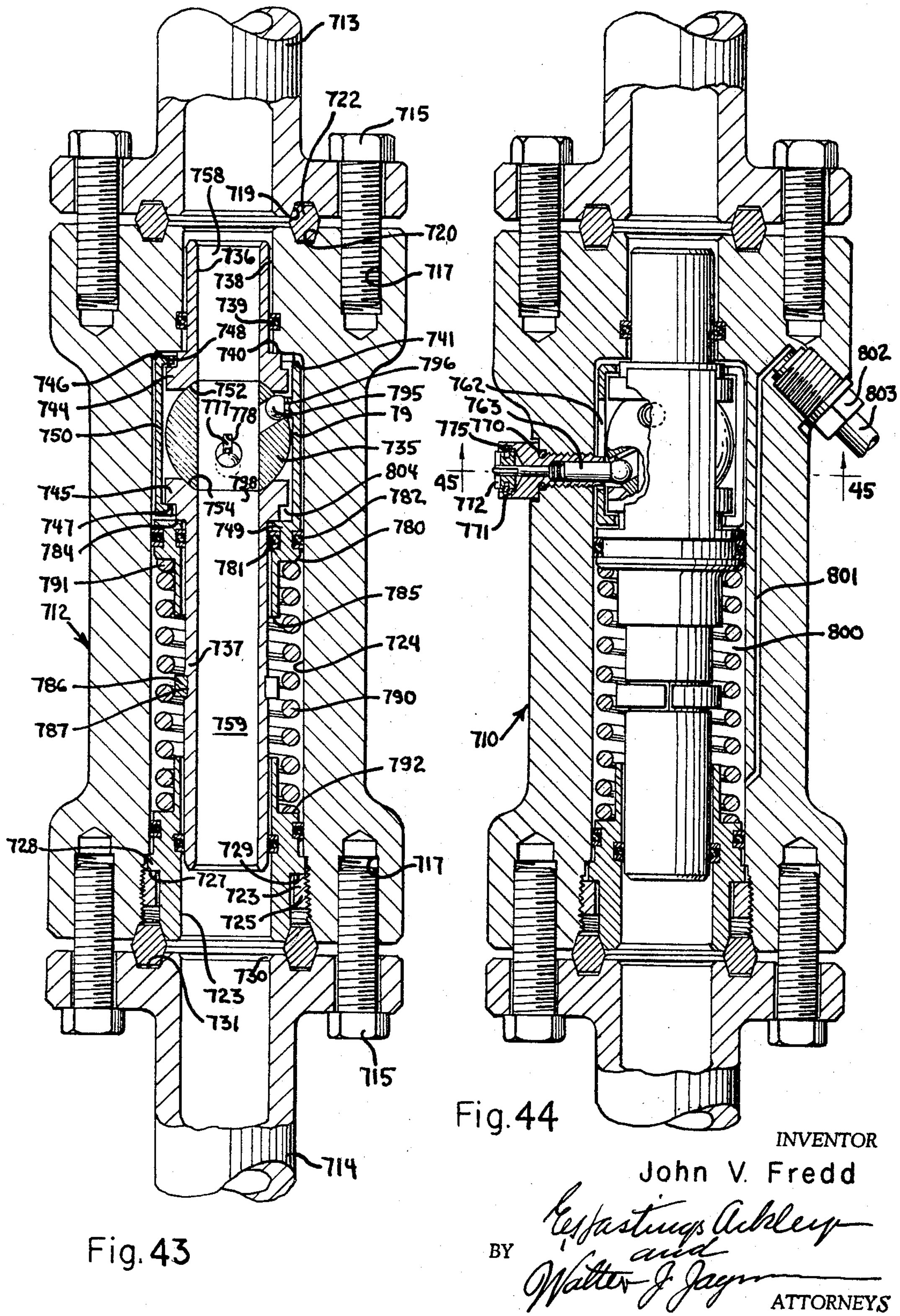
FIGURE 43 is a vertical partly sectional view of another modified form of the valve embodying the invention.
FIGURE 44 is another vertical sectional view of the valve illustrated in FIGURE 43.

The upper and lower seat members have annular spherical seat surfaces 752 and 754 which are adapted to sealingly engage the spherical outer surface of the ball 735. The ball 735 has an axial passage 757 which, when the ball is in its open position illustarted in FIGURE 43, is aligned with and in communication with the passages 758 and 759 of the upper and lower seat members. The axial passage of the ball extends at an angle of 90° to the passages of the seat members and out of communication therewith when the ball is in its closed position illustrated in FIGURE 47.

The connector member 750 has an elongate longitudinal slot 762 through which extends the shank rod 763 of a pivot pin 764 whose ball 765 is received in the radial bore 766 of the ball 735. A shank retainer 767 is threaded in a lateral bore 768 of the housing and its inner reduced end portion also extends into the elongate slot 762 of the connector member. The shank intermediate its ends is provided with an external annular recess in which an O-ring 769 is disposed which seals between the shank and the shank retainer. Similarly, an O-ring 770 disposed in an external annular recess of the shank retainer seals between the shank retainer and the housing. The shank has an outer reduced end portion 771 whose outer end extends through an indicator disc 772 and is held against rotation relative thereto since the outer end of the shank is of non-circular configuration and extends through a central aperture of the indicator disc of similar configuration. The indicator disc is releasably held against outward movement from the outer enlarged portion of the bore of the shank housing by a resilient ring 775 whose outer portions are received in an internal annular recess of the shank housing and whose inner portions are received in the external annular recess of the indicator disc. The shank rotates with the ball due to the provision of a lug 777 on the pivot ball which is received in a slot 778 of the ball 735 which opens into its radial bore 766. The disc has a diametrical external slot which indicates the rotational position of the pivot pin.

A piston 780 slidably disposed in the housing passage 724 has an internal annular recess in which is disposed a suitable sealing means 781, which may include an O-ring and back-up rings, which seals between the lower seat member and the piston and with an external annular recess provided with a similar seal means 782 between the piston and the valve housing. Upward movement of the piston relative to the lower seat member is limited by the engagement of its top end surface with the downwardly facing annular shoulder 784 of the lower seat member. Its downward movement relative to the lower seat member is limited by the engagement of its annular bottom end shoulder 785 with the top surface of a split stop ring 786 mounted on the lower seat member whose inner portions are disposed in an external annular groove 787 of the lower seat member. The piston is biased upwardly in the housing by a spring 790 whose top end engages the downwardly facing annular shoulder 791 of the piston and whose bottom end engages the annular upwardly facing shoulder 792 of the stop member 723.

The piston has an upward extension 795 which may be in the form of a segment of a cylinder and which is provided with a pivot pin 796 whose ball 797 is disposed in a radial slot 798 of the ball 736. The central longitudinal axes of the bores 766 and 798 of the ball extend convergently inwardly at an angle of approximately 70 degrees to the central longitudinal axis of the axial passage 757 of the ball, FIGURE 45, and extend convergently at an angle of approximately 30 degrees each to the central plane of the ball which is perpendicular relative to the longitudinal axis of the ball passage 757. It is found that this angular relation of the radial bores of the ball relative to each other and to the longitudinal axis of the axial passage of the ball permits the ball to be rotated first in one direction without any longitudinal movement in the housing about one axis and then about another axis and with longitudinal movement as it is moved between its open position illustrated in FIGURES 44 through 46 and its closed position illustrated in FIGURE 47.

Fluid under pressure may be introduced into and exhausted from the lower chamber 800 below the piston between the lower seat member and the valve housing through a passage 801 of the housing in whose threaded upper end portion the fitting 802 is threaded. The fitting connects a suitable conduit 803 to the housing. Fluid pressure from the ball passage 757 is introduceable into the chamber 804 between the seat members and the housing above the piston to act on the upwardly facing surfaces of the piston through the radial bores 766 and 798 of the valve 735 since the pivot balls have a relatively loose fit in the radial bores.

Figure 45:
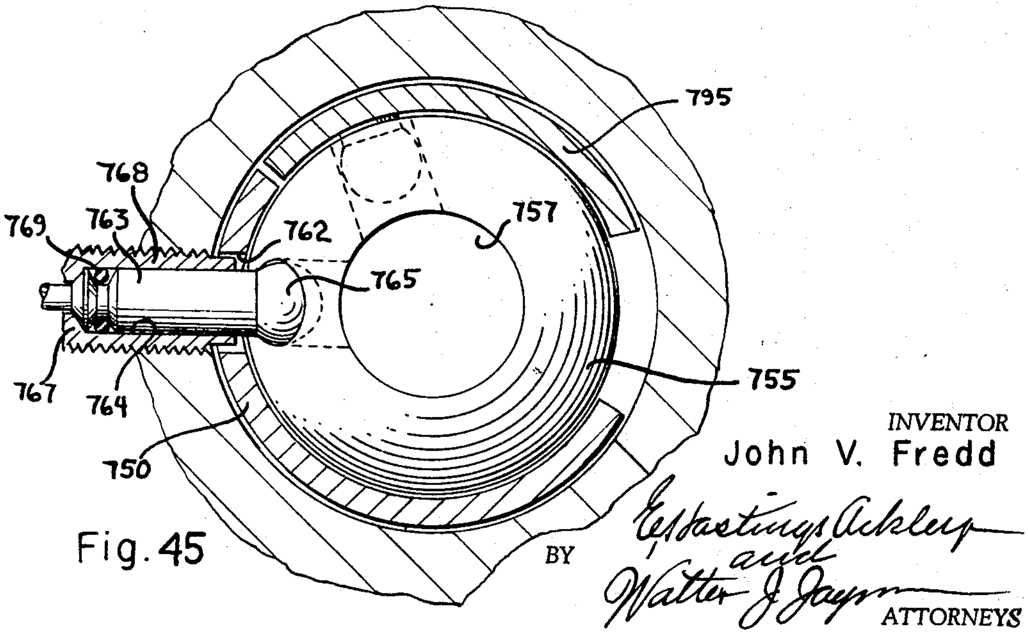
FIGURE 45 is a sectional view taken on line 45—45 of FIGURE 44.

When the valve is in its open position illustrated in FIGURES 43 and 44 the force of the spring 790 and of the pressure in the chamber 800 is sufficiently great to overcome the force of the pressure of the fluid being conducted through the valve which acts on the upwardly facing surfaces of the piston, and the valve is held in its open position. When it is desired to close the valve, the pressure in the chamber 800 is reduced by means of suitable controls associated with the conduit 803 which permit fluid to exhaust from the chamber 800 through the conduit and, as the pressure in the chamber 800 decreases below that necessary to hold the piston in its upper position, the upstream pressure acting on the upwardly facing areas of the piston moves the piston downwardly against the resistance of the spring 790 and as the piston moves downwardly the ball is rotated about the longitudinal axis of the bore 766. The piston moves downwardly and rotates in a clockwise direction, until the ball is rotated to the position illustrated in FIGURE 46. During this initial rotation of the ball, the seat members and the ball tend to remain stationary since the pressure differential thereacross remains substantially constant as long as the axial passage of the ball remains in connection with the passages of the seat members. As the ball reaches the position illustrated in FIGURE 46 wherein its axial passage 757 moves out of alignment with the passages 758 and 759 of the upper and lower seat members, a downwardly acting pressure differential is established across the ball and the seat members. At this time, the bottom end shoulder 785 of the piston engages the top end shoulder of the stop ring 786 and the force of the upstream pressure is now effective to move both the seat members and the ball downwardly in the housing. During this downward movement of the members and the ball, the ball is rotated about an axis which is perpendicular to the line bisecting the axes of the two longitudinal axis of the two radial bores as seen in FIGURE 45, and the ball rotates from the position illustrated in FIGURE 46 to the position illustrated in FIGURE 47. The piston rotates in a counter-clockwise direction to accommodate this rotational movement of the ball.

Figures 46, 47, 48:
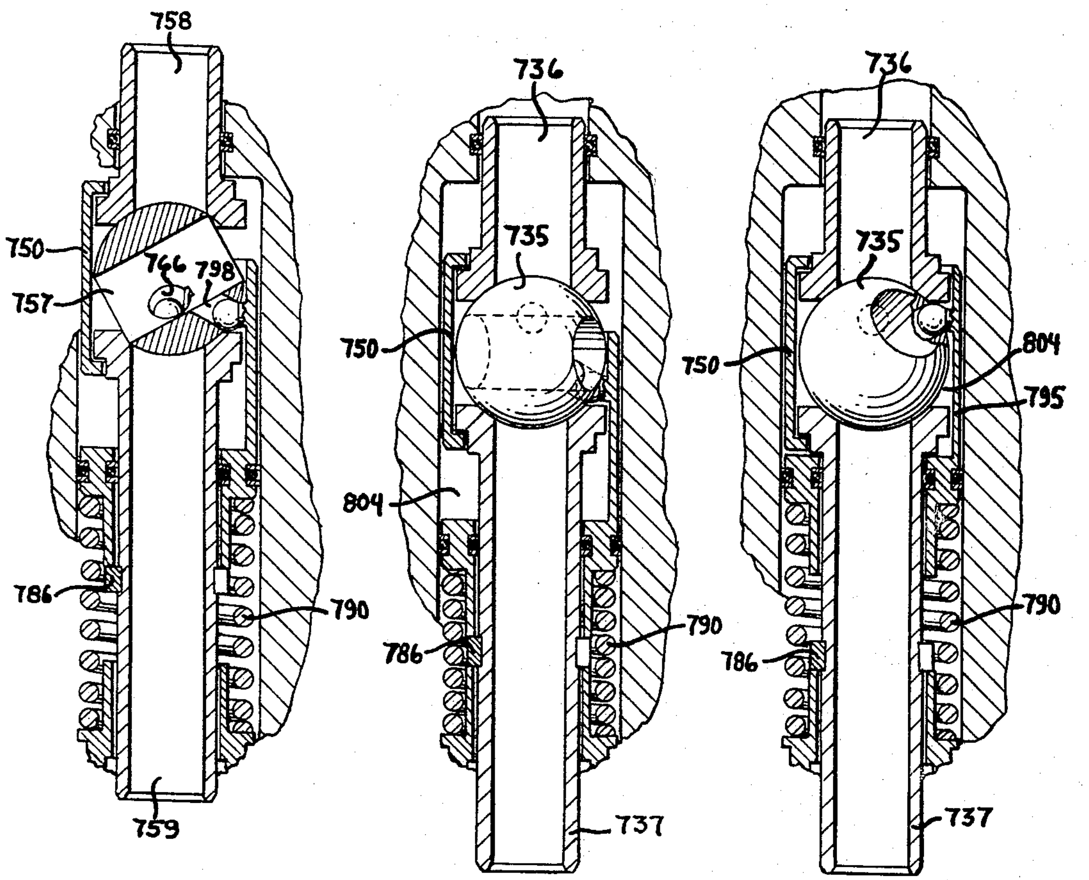
FIGURE 46 is a fragmentary vertical sectional view showing the elements of the valve in an intermediate position as the valve is moving from its open toward its closed position.
FIGURE 47 is a view similar to FIGURE 46 showing the valve in its closed position.
FIGURE 48 is a view similar to FIGURE 47 showing the elements of the valve in an intermediate position as the valve is moving from its open toward its closed position.

The ball is then held in closed position until fluid pressure is again introduced into the passage 800 and the combined force of the pressure acting on the downwardly facing surfaces of the piston and of the spring 790 exceeds the force of the upstream pressure above the ball, and the piston moves upwardly to the position illustrated in FIGURE 48 while the seat members and the ball are held aaginst upward movement in the valve housing by the upstream fluid pressure. During this upward movement of the piston, the ball is rotated about the longitudinal axis of the radial bore 766, the piston rotating in a clockwise manner, FIGURE 45, to accommodate this upward rotational movement of the ball. When the ball reaches approximately the position illustrated in FIGURE 48, the top end of the piston engages the annular shoulder 784 of the lower seat member. Further upward movement of the piston then causes upward movement of the lower seat member, and therefore of the ball and the upper seat member. During this further upward movement of the ball to the fully open position illustrated in FIGURES 43 through 45, the ball rotates about the axis which extends perpendicularly to the line bisecting the angle between the axes of the radial bores as seen in FIGURE 45.

When the ball reaches its fully open position, further upward movement of the ball and the seat members is arrested due to the engagement of the shoulder 740 of the upper seat member with the downwardly facing shoulder 741 of the valve housing. It will thus be apparent that the ball 735 of the valve 710 is held against downward movement during its rotation about a first axis from the position wherein its axial passage is in communication with the seat member passage to a position wherein it is out of communication therewith and then is moved downwardly in the valve housing and rotated about a second axis to its fully closed position. Similarly, the ball is merely rotated without moving longitudinally in the valve housing until it moves to a position wherein its axial passage is in communication with the passages of the seat members and then is rotated and simultaneously moved upwardly to its fully open position. It will thus be seen that longitudinal movement of the ball in the passage occurs only after it is partially open during its movement from closed to open position so that the force needed to open the valve is relatively small since the pressure differential across the ball tending to hold it in closed position decreases at substantially the time that its longitudinal movement in the housing begins.

It will now be seen that in each of the several illustrated and described forms of the valve embodying the invention, the closure member or ball is rotatable between open and closed positions by operator means which rotate the ball about more than one radial axis thereof during its movement between its open and closed position and that the position of the longitudinal axis of the axial passage of the ball when the ball is in its open position is displaced substantially 90 degrees from its position when the ball is in its closed position.

It will further be seen that in all forms of the valve embodying the invention, the central longitudinal axis of the axial passage rotates not only about a horizontal axis but also about a vertical axis first in one direction and then in the opposite direction as the ball moves between its open and closed positions.

It will further be seen that in case of the valves 50, 50*a*, and 450, the balls thereof do not move longitudinally during their rotation between their upper open and closed positions while the balls of the valves 300, 600 and 710 are movable both longitudinally and rotationally in their housing during their rotation between their open and closed positions.

It will further be seen that the ball of each of the valves has been provided with a pair of radial bores spaced apart a predetermined radial angle of the ball, the axes of the radial bores being spaced a predetermined angle of less than ninety degrees from the longitudinal axis of the axial passage of the ball, and that the operator means of each ball include pivot pins which extend into the radial bores to engage the balls and cause the balls to rotate in their housings as the operator means move in the housing.

It will further be seen that the operator members may cause the balls to rotate sequentially about different radial axes of the balls during the movement of the balls between their open and closed positions or the operator members may cause the balls to rotate about a radial axis which itself is rotating about both horizontal and vertical axes.

It will further be seen that the operator means of the valves may be responsive to the pressure or flow conditions of the fluid whose flow is controlled by the valves or may be responsive to an external fluid pressure.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A valve including: spaced tubular means having passages and spaced facing seat surfaces; a ball rotatably disposed between said seat surfaces and having an axial passage therethrough, said ball being rotatable between an open position wherein said axial passage is in communication with said passages of said tubular means and a closed position wherein said axial passage is not in communication with said passages; and operator means for moving said ball between said open and closed positions, said operator means and said ball having co-engageable means for rotating said ball about more than one radial axis thereof during its movement between said open and closed position.

2. A valve including: spaced tubular means having passages and spaced seat surfaces; a ball rotatably disposed between said seat surfaces and having an axial passage therethrough, said ball being rotatable between an open position wherein said axial passage is in communication with said passages and a closed position wherein said axial passage is not in communication with said passages, the position of the longitudinal axis of said axial passage when the ball is in its closed position being displaced substantially 90 degrees from its position when the ball is in said open position; and operator means for moving said ball between said open and closed positions, said operator means and said ball having co-engageable means for rotating said ball about more than one radial axis of the ball during its movement between said open and closed positions.

3. A valve including: spaced tubular means having passages and spaced seat surfaces; a ball rotatably disposed between said seat surfaces and having an axial passage therethrough, said ball being rotatable between an open position wherein said axial passage is in communication with said passages and a closed position wherein said axial passage is not in communication with said passages, the position of the longitudinal axis of said axial passage when the ball is in its closed position being displaced substantially 90 degrees from its position when the ball is in said open position; and operator means for moving said ball between said open and closed positions, said operator means and said ball having co-engageable means for rotating said ball about more than one radial axis of the ball during its movement between said opening and closed positions, the longitudinal axis of said axial passage moving about mutually perpendicular central axes of the ball during the movement of the ball between its open and closed positions.

4. A valve including: spaced tubular means having passages and spaced facing seat surfaces; a ball rotatably disposed between said seat surfaces and having an axial passage therethrough, said ball being rotatable between an open position wherein said axial passage is in communication with said passages of said tubular means and a closed position wherein said axial passage is not in communication with said passages; and operator means for moving said ball between said open and closed positions, said operator means and said ball having co-engageable means for rotating said ball about more than one radial axis thereof during its movement between said open and closed position, said operator means including means exposed to and responsive to pressure conditions of the fluid whose flow is controlled by the value for causing said operator means to move said ball between said open and closed position.

5. The valve of claim 3 wherein said operator means includes means exposed to and responsive to external fluid pressure for causing said operator means to move said ball between said open and closed positions.

6. A valve including: a tubular housing having a passage therethrough and means for providing spaced facing seat surfaces; a ball disposed in said housing between said surfaces and having an axial passage therethrough, said axial passage being in communication with said housing passage when said ball is in an open position to permit fluid flow through said valve, said axial passage being out of communication with said housing passage when said ball is in a closed position to prevent fluid flow through said valve, the position of the longitudinal axis of said axial passage when the ball is in closed position being displaced 90 degrees from its position when the ball is in its open position; piston means movable longitudinally in said housing; operator members in said housing having means pivotally engageable with said ball at circumferentially spaced locations for rotating said ball about more than one radial axis thereof upon predetermined longitudinal and rotational movement of said operator member in said housing, said piston means and said operator members having co-engageable means for imparting said predetermined longitudinal and rotational movement to said operator members upon longitudinal movement of said piston means in said housing.

7. A valve including: a tubular housing having a passage therethrough and means providing spaced facing seat surfaces; a ball disposed in said housing between said seat surfaces and having an axial passage therethrough, said axial passage being aligned with and in communication with said housing passage when said ball is in an open position to permit fluid flow through said valve, said axial passage being out of alignment and out of communication with said housing passage when said ball is in a closed position to prevent fluid flow through said valve, the position of the central longitudinal axis of said axial passage when the ball is in said closed position being disposed substantially 90 degrees from its position when the ball is in said open position, said ball having a pair of radial bores having axes spaced apart a predetermined angle; piston means movable longitudinally in said housing; a pair of operator members in said housing each having pivot means extending into said radial bores, the longitudinal axis of each said radial bores being spaced angularly less than 90 degrees from the longitudinal axis of said axial bore; said operator members and said piston means having co-engageable means for moving said operator members circumferentially and longitudinally in said housing to cause said ball to rotate about more than one radial axis thereof during the movement of said piston means in said housing, said position means being responsive to the fluid pressure of fluid flowing through said valve for moving said piston longitudinally in one direction in said housing; and means biasing said piston longitudinally in a direction opposite said one direction.

8. A valve including: a tubular housing having a passage therethrough and means providing spaced facing seat surfaces; a ball disposed in said housing between said seat surfaces and having an axial passage therethrough, said axial passage being aligned with and in communication with said housing passage when said ball is in an open position to permit fluid flow through said valve, said axial passage being out of alignment and out of communication with said housing passage when said ball is in a closed position to prevent fluid flow through said valve, the position of the central longitudinal axis of said axial passage when the ball is in said closed position being disposed substantially 90 degrees from its position when the ball is in said open position, said ball having a pair of radial bores having axes spaced apart a predetermined angle; piston means movable longitudinally in said housing; a pair of operator members in said housing each having pivot means extending into said radial bores, the longitudinal axis of each of said radial bores being spaced angularly less than 90 degrees from the longitudinal axis of said axial bore; said operator members and said piston means having co-engageable means for moving said operator members circumferentially and longitudinally in said housing to cause said ball to rotate about more than one radial axis thereof during the movement of said piston means in said housing, said piston means being responsive to pressure of fluid from exteriorly of said valve for moving said piston longitudinally in said housing.

9. A valve including: a tubular housing having a passage therethrough and means providing spaced facing seat surfaces; a ball disposed in said housing between said seat surfaces and having an axial passage therethrough, said axial passage being aligned with and in communication with said housing passage when said ball is in an open position to permit fluid flow through said valve, said axial passage being out of alignment and out of communication with said housing passage when said ball is in a closed position to prevent fluid flow through said valve, the position of the central longitudinal axis of said axial passage when the ball is in said closed position being disposed substantially 90 degrees from its position when the ball is in said open position, said ball having a pair of radial bores having axes spaced apart a predetermined angle; piston means movable longitudinally in said housing; a pair of operator members in said housing each having pivot means extending into said radial bores, the longitudinal axis of each of said radial bores being spaced angularly less than 90 degrees from the longitudinal axis of said axial bore; said operator members and said piston means having co-engageable means for moving said operator members circumferentially and longitudinally in said housing to cause said ball to rotate about more than one radial axis thereof during the movement of said piston means in said housing, said piston means being responsive to pressure of fluid from exteriorly of said valve for moving said piston longitudinally in one direction in said housing and means biasing said piston longitudinally in a direction opposite said one direction.

10. A valve including: a housing having seat means providing a longitudinal passage through said housing and facing annular seat surfaces; a ball in said housing between said seat surfaces; an operator sleeve in said housing disposed about said ball and said seat means, said operator sleeve being movable longitudinally in said housing between upper and lower positions; means for introducing fluid pressure into said housing to move said operator sleeve longitudinally in said housing, said ball having an axial passage which is in communication and alignment with said passage when said ball valve is in open position and which is out of alignment and communication with said passage when the ball is in closed position, said ball having radial bores spaced apart a predetermined angle, the axes of said radial bores being angularly spaced from the longitudinal axis of said axial passage an angle of less than 90 degrees; and operator members in said housing having pivot means extending into said radial bores, said operator members and said operator sleeve having co-engageable means for causing said operator members to rotate said ball valve from its open position to its closed position upon longitudinal movement of said operator sleeve in one direction in said housing and from closed to open position upon longitudinal movement of said operator sleeve in a second direction, said ball being rotated about the more than one radial axis thereof during its movement between its open and closed positions.

11. The valve of claim 10 wherein said co-engageable means move said operator members longitudinally and rotationally in predetermined sequence to cause said ball to rotate about the axis of one radial bore, then about the axis of the other radial bore and finally about an axis perpendicular to the line bisecting the radial axes of the bores during its movement between its open and closed position.

12. The valve of claim 10 wherein said co-engageable means move said ball about a radial axis which itself is moving during the movement of said ball between said open and closed positions.

13. The valve of claim 10 wherein said axes of said radial bores lie in a plane extending at an angle of approximately twenty degrees to the longitudinal axis of said axial passage and wherein said axes of said bores extend at an angle of approximately 110 degrees to each other.

14. The valve of claim 13 wherein said co-engageable means move said operator members longitudinally and rotationally in predetermined sequence to cause said ball to rotate about the axis of one radial bore, then about the axis of the other radial bore, and finally about an axis perpendicular to the line bisecting the radial axes of the bores, during its movement between its open and closed position.

15. The valve of claim 14 wherein said co-engageable means move said ball about a radial axis which itself is moving during the movement of said ball between said open and closed positions.

16. A valve including: a housing, said housing having means providing a passage through said valve and spaced facing seat surfaces; a ball having an axial passage rotatably disposed between and engageable with said seat surfaces, said ball having a pair of spaced radial bores, the axes of said bores extending at a predetermined angle of less than 90 degrees to the axis of said axial passage; operator members disposed in said housing and having pivot means extending into said radial bores; an operator sleeve movable in said housing, said operator sleeve and said operator members have co-engageable means for causing said operator members to move rotationally and longitudinally in said housing to move said ball valve in a predetermined manner about more than one radial axis thereof during its movement between its open and closed positions upon longitudinal movement of said operator sleeve in said housing; means upstream of said valve for creating a pressure differential upstream and downstream of the valve; means biasing said operator sleeve and operator members in one longitudinal direction to hold said ball in open position; and piston means responsive to said pressure differential for moving said operator sleeve in a direction opposite said one direction to move said ball to its closed position when said pressure differential exceeds a predetermined value.

17. The valve of claim 16, and latch means operatively associated with said operator sleeve for releasably holding said operator sleeve against movement in said one direction.

18. The valve of claim 17 wherein said co-engageable means during each movement of said ball between its open and closed positions cause one of said operator members to move rotationally and longitudinally and hold the other of said operator members against rotation, then both of said operator members to move longitudinally while holding said one of said operator members against rotation and then both of said operator members to move longitudinally.

19. The valve of claim 16, wherein said co-engageable means causes both simultaneous longitudinal and rotational movement of both operator members in opposite directions during longitudinal movement of said operator sleeve in either longitudinal direction in said housing.

20. The valve of claim 17 wherein said co-engageable means causes both simultaneous longitudinal and rotational movement of both operator members in opposite directions during longitudinal movement of said operator sleeve in either longitudinal direction in said housing.

21. A valve including: a tubular housing; upper and lower seat members in said housing and movable longitudinally therein, said seat members having aligned longitudinal pasages and facing seat surfaces; means for preventing movement of said seat members away from one another; a ball having an axial passage therethrough disposed rotatably between said seat members and in engagement with said seat surfaces, said ball having a pair of radial spaced bores, said axial passage being in alignment and communication with said passages when said ball is in an upper open position in said housing and being out of communication with said passages when said ball is in a lower position in said housing; a first pivot means rigid with said housing extending into one of said radial bores; piston means longitudinally movable in said housing between upper and lower positions, said piston means having second pivot means extending into the other of said radial bores, said piston means extending about said lower seat member; means limiting longitudinal movement of said piston means relative to said lower seat member; means biasing said piston upwardly in said housing; means for introducing fluid pressure to said piston means to exert an upward force on said piston means; the pressure of fluid flowing through said valve exerting a downward force on said piston means, said piston means when moving from said upper position to said lower position causing said ball to rotate about the radial axis of said one of said bores to a position intermediate its open and closed positions wherein said axial passage moves out of communication with said longitudinal passages, and then to rotate and move longitudinally downwardly with said seat members to its closed position when downward movement of the piston means relative to said lower seat member is arrested, said piston means when moving from said lower position to said upper position causing said ball to rotate about the radial axis of said one of said bores to an intermediate position between its open and closed positions wherein said axial passage is in communication with said passages and then to rotate about another axis and move longitudinally upwardly with said seat means to its open position when upward movement of said piston means rotative to said lower seat member is arrested.

22. The valve of claim 21 wherein said axes of said radial bores extend divergently from the longitudinal axis of said axial passage on opposite sides of a central plane of said ball perpendicular to the longitudinal axis of said axial passage.

23. The valve of claim 21 wherein the axes of said radial bores extend at an angle of approximately 70 degrees from each other as viewed parallel to the longitudinal axis of said axial passage.

24. The valve of claim 21 wherein said axes of said radial bores extend divergently from the longitudinal axis of said axial passage and on opposite sides of and at an angle of approximately thirty degrees to a central plane of said ball perpendicular to the longitudinal axis of said axial bore.

25. A valve including: a housing providing spaced facing seat surfaces; a ball having an axial flow passage disposed in said housing between said seat surfaces, said housing and said ball having co-engageable first pivot means limiting longitudinal and rotational movement of the ball in the housing; and pressure responsive means in said housing having second pivot means engageable with said ball at a location spaced from said first pivot means for moving said ball between open and closed positions, said pressure responsive means being movable longitudinally and rotatably in said housing for causing said ball to rotate about more than one radial axis thereof during movement of said ball between its open and closed positions.

26. A valve including: a tubular housing having a passage therethrough and means providing spaced facing seat surfaces; a ball disposed in said housing between said seat surfaces and having an axial passage therethrough, said axial passage being aligned with and in communication with said housing passage when said ball is in an open position to permit fluid flow through said valve, said axial passage being out of alignment and communication with said housing passage when said ball is in a closed position to prevent fluid flow through said valve, the position of the longitudinal axis of said axial passage when the ball is in said closed position being displaced substantially 90 degrees from its position when the ball is in said open position, said ball having a pair of radial bores having axes spaced apart a predetermined angle; first and second piston means movable longitudinally in said housing, said piston means having pivot means extending into one of said radial bores, the longitudinal axis of each of said radial bores being spaced angularly less than 90 degrees from the longitudinal axis of said axial passage, means biasing one of said piston means in one longitudinal direction in said housing to hold said ball in said open position, said second piston means being responsive to fluid pressure differential upstream and downstream of said ball, said piston means moving said ball during its movement between said open and closed positions first about the radial axis of one of said bores and then about the axis of the other of said bores.

27. A valve including: a tubular housing; an upper seat member and a lower seat member movably mounted in said housing, said seat members having longitudinal passages and facing seat surfaces; a ball having an axial flow passage therethrough disposed between said seat surfaces, said upper seat member having means exposed to pressure from exterior of the valve for exerting a downward force on said upper seat member; said ball having spaced radial bores; a first piston means in said housing having pivot means extending into one of said bores; means biasing said first piston means upwardly in said housing, latch means coengageable with said first piston means and said lower seat means for preventing upward movement of said first piston means relative to said lower seat means when said ball is in a lower closed position in said housing wherein its axial passage is out of communication with the passages of said seat members, said latch means being co-engageable with said housing and said first piston means when said ball is in an upper open position in said housing to limit upward movement of said first piston means in said housing; a second piston means having pivot means extending into the other of said radial bores; means limiting longitudinal movement of said second piston means relative to said upper seat member and said housing, said second piston means being in a lower position relative to said housing and in an upper position relative to said upper seat member when said ball is in said upper open position and being in an upper position relative to said housing and in a lower position relative to said lower seat member when said ball is in said lower closed position, said piston means being exposed to the pressure upstream and downstream of said ball and movable to rotate said ball about a plurality of radial axes of said ball determined by said spaced radial bores of said ball.

28. The valve of claim 27, wherein the radial axes of said radial bores are spaced substantially 110 degrees apart about the central longitudinal axis of said axial passage and lie in a plane extending at an angle of approximately 30 degrees from the central plane of the ball perpendicularly to the longitudinal axis of said axial bore.

29. A valve including: a pair of tubular seat members; a ball disposed between said seat members and having an axial passage therethrough; and operator means engageable with said ball for rotating said ball between open and closed positions about a radial axis thereof moving arcuately.

30. The valve of claim 29 wherein said operator means movably engage said ball at circumferentially spaced locations displaced from the longitudinal central plane of the ball perpendicular to the axis of said axial passage.

References Cited

UNITED STATES PATENTS

| | | | |
|---|---|---|---|
| Re. 25,471 | 11/1963 | Fredd | 166—224 XR |
| 1,773,775 | 8/1930 | Childs | 137—495 XR |
| 2,015,055 | 9/1935 | Adams | 137—115 |
| 2,973,005 | 2/1961 | Dollison et al. | 251—341 XR |
| 2,998,077 | 8/1961 | Keithahn | 251—341 XR |
| 3,126,908 | 3/1964 | Dickens | 166—244 XR |
| 3,189,044 | 6/1965 | Sizer | 166—244 XR |
| 3,236,255 | 2/1966 | Sizer | 166—244 XR |
| 3,273,588 | 9/1966 | Dollison | 166—224 XR |
| 3,294,104 | 12/1966 | Mercier | 137—115 XR |
| 3,310,114 | 3/1967 | Dollison | 166—224 XR |

M. CARY NELSON, *Primary Examiner.*

R. J. MILLER, *Assistant Examiner.*